(12) United States Patent
Barber

(10) Patent No.: US 8,965,601 B1
(45) Date of Patent: Feb. 24, 2015

(54) SYSTEM, MODULE, AND METHOD FOR PRESENTING A FLIGHT DIRECTOR-DEPENDENT HITS PATHWAY ON AN AIRCRAFT DISPLAY UNIT

(75) Inventor: Sarah Barber, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 1192 days.

(21) Appl. No.: 12/284,561

(22) Filed: Sep. 23, 2008

(51) Int. Cl.
*G06F 7/70* (2006.01)

(52) U.S. Cl.
USPC .............................. 701/14; 340/974; 340/975

(58) Field of Classification Search
USPC ....................... 701/14, 16; 340/974, 975, 973
See application file for complete search history.

(56) References Cited

U.S. PATENT DOCUMENTS

| | | | |
|---|---|---|---|
| 7,010,398 B2 * | 3/2006 | Wilkins et al. ..................... | 701/3 |
| 7,268,702 B2 * | 9/2007 | Chamas et al. ................ | 340/975 |
| 7,295,135 B2 * | 11/2007 | Younkin ....................... | 340/971 |
| 7,505,835 B2 * | 3/2009 | Brust et al. ........................ | 701/3 |
| 7,869,943 B1 * | 1/2011 | Simon .......................... | 701/206 |
| 7,899,586 B2 * | 3/2011 | Markiton et al. ............... | 701/16 |
| 8,457,889 B2 * | 6/2013 | Feyereisen et al. ........... | 701/467 |
| 2005/0085959 A1 * | 4/2005 | Feyereisen ....................... | 701/14 |
| 2010/0030405 A1 * | 2/2010 | He et al. ............................ | 701/14 |

OTHER PUBLICATIONS

Lawrence J. Prinzel III, "Head-Up Displays and Attention Capture", Feb. 2001, 36 pages.*

* cited by examiner

*Primary Examiner* — Kira Nguyen
(74) *Attorney, Agent, or Firm* — Angel N. Gerdzhikov; Donna P. Suchy; Daniel M. Barbieri

(57) ABSTRACT

A present novel and non-trivial system, apparatus, and method is disclosed for presenting a flight director-dependent highway in the sky ("HITS") pathway on an aircraft display unit. A processor receives flight plan data and flight director data, generates HITS data set representative of a flight director-dependent HITS pathway using flight plan data and flight director data, and provides the HITS data set to a display system for presentation of the flight director-dependent HITS pathway on a tactical display unit. Flight plan data provided to the processor may comprise of data sourced by a navigation system or HITS pathway data generated independently of flight director data. When presented on a tactical display unit, the flight director-dependent HITS pathway may be depicted with the flight director, where the proximal end of the HITS pathway aligns with the flight director.

17 Claims, 16 Drawing Sheets

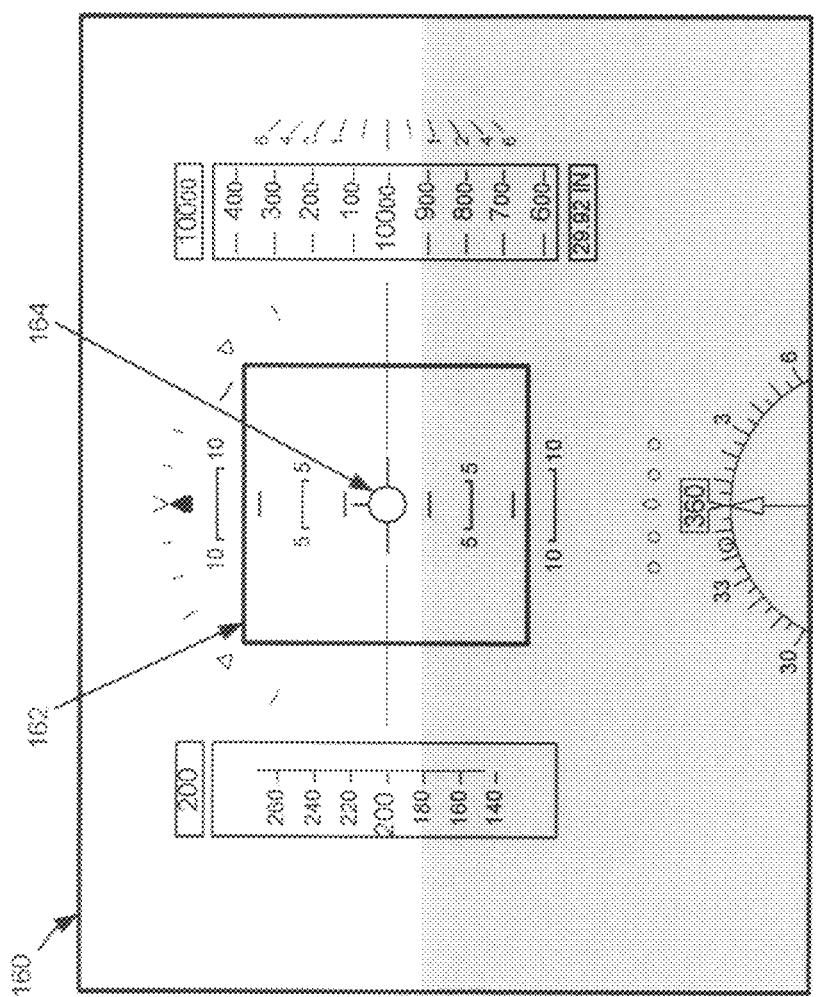

SYSTEM, MODULE, AND METHOD FOR PRESENTING A FLIGHT DIRECTOR-DEPENDENT HITS PATHWAY ON AN AIRCRAFT DISPLAY UNIT

BACKGROUND OF THE INVENTION

1. Field of the Invention

This invention pertains generally to the field of cockpit indicators or display units that provide flight information to the pilot or flight crew of an aircraft, and more particularly to highway in the sky ("HITS") pathway depictions on one or more display units providing an artificial horizon through a synthetic vision system ("SVS"), an enhanced vision system ("EVS"), a combined SVS-EVS vision system, and/or a vision system that may produce a classic electronic primary flight display ("PFD").

2. Description of the Related Art

Cockpit indicators may provide navigation and/or course information to a pilot which allows the pilot to determine if the aircraft is flying on course with a flight plan. Traditional or classic indicators have been driven using signals generated using ground-based navigation aids that are received by the aircraft. Data represented in the signals is used to provide course information to the pilot by depicting or providing vertical and/or horizontal bars (i.e., "needles") where the pilot is required to "fly the needles" to stay on course. If the aircraft was on course, the needles would be centered on the indicator.

With the existence of a satellite-based navigation system such as global positioning system ("GPS") and with the growing ability to depict the scene outside of the aircraft with a synthetic and/or enhanced image on a tactical display unit such as a primary flight display ("PFD"), there has been a trend in the aviation community to replace needles with a HITS pathway for providing course information. In one form, a HITS pathway comprises a "tunnel" where the pilot is required to "fly the tunnel" to stay on course.

The depiction of the tunnel is based on, in part, the flight plan between successive navigation fixes (e.g., waypoints) that may or may not have corresponding altitude constraints. A system such as a flight management system ("EMS") may receive the flight plan and generate flight plan data divided into lateral flight plan and vertical flight plan components. When this information is made available to a flight director system, such system may generate guidance information data and provide such data to a display system which, in turn, presents course guidance information in the form of flight director symbology so that the aircraft can fly an FMS-generated flight plan if the flight director is set to an "auto" mode. Often, the flight director system is part of an autoflight system that also provides guidance signals to an autopilot system which, in turn, causes the aircraft to fly the flight plan automatically.

Although an autoflight system is beneficial to the pilot, there are times when the pilot may want to fly a flight plan that is different from an FMS-generated flight plan and the HITS pathway. For instance, an FMS may determine a vertical flight plan for a departure course between the take-off and cruise phases of flight, but the pilot may wish to climb to a higher altitude at a faster rate than the rate determined by an FMS. At such a time, a pilot may switch to a "manual" mode of the flight director, and based on manually-selected inputs directed to the flight director, a flight director may provide guidance information data reflecting a higher path angle corresponding to a higher rate of climb; however, the HITS tunnel would remain at its current position, causing a divergence between the flight director and the HITS tunnel. For a period of time, the pilot may intentionally steer the aircraft to a higher path attitude as directed by the flight director and away from the tunnel; that is, for a HITS pathway depicted by a tunnel, flight director guidance could cause the pilot to not "fly the tunnel."

The pathway depicted as a HITS may be generated using an Earth-based reference system. Earth-based reference systems may be employed in cruise, arrival, and approach phases of flight with little difficulty because paths associated with these phases of flight may provide a fixed flight level or glide path angle in the vertical flight plan. While these phases of flight may provide definite guidance for a vertical flight plan, such definite guidance (such as a fixed climb gradient) of an Earth-based reference system is generally not applied in the take-off and/or departure phases of flight. Navigation systems such as an FMS may not create an Earth-based referenced climb gradient; instead, vertical flight plans may be defined using altitude constraints at which an aircraft may cross at, above, or below the navigation fix associated with the constraint. Even if an Earth-based reference is used for a climb gradient, it would be a difficult task for a pilot to fly such a path given other considerations that a pilot must consider on a departure such as maximum speed constraints associated with an airspace surrounding an airport. Moreover, in the interest of fuel economy, it may be beneficial to climb as high as possible and as early as possible using maximum climb thrust. An HITS pathway based on an Earth-based reference system may limit the pilot's ability to "fly the tunnel" while attempting to achieve a greater climb gradient; however, a HITS pathway based on an air mass-referenced system that is provided inherently through various vertical modes of a flight director system may provide the pilot such ability.

BRIEF SUMMARY OF THE INVENTION

A present novel and non-trivial system, apparatus, and method is disclosed for presenting HITS pathway on an aircraft display unit that is dependent of a flight director. The use of a flight director-dependent HITS pathway will enhance situational awareness by providing a HITS pathway aligned with the flight director, where the position of the proximal end of the HITS pathway is aligned with the position of the flight director whether the flight director is actually displayed.

In one embodiment, a system is disclosed for presenting a flight director-dependent HITS pathway. The system comprises sources of flight mode data, flight plan data, and flight director data; a processor configured to generate a HITS data set representative of such a pathway using the flight plan data and the flight director data; and a display system for presenting such pathway. In another embodiment, a flight mode data source may be a pilot interface system that could comprise a flight control panel for providing vertical flight modes and/or lateral flight modes. In another embodiment, a flight plan data source may be an FMS for providing a vertical flight plan and/or lateral flight plan. In another embodiment, a flight director data source may be a flight director system for providing vertical guidance and/or lateral guidance. In another embodiment, flight plan data received by the processor could be HITS pathway data determined independently of the flight director data. In another embodiment, the HITS image data set generated by the processor includes data representative of a flight director symbology such that the proximal end of the HITS pathway may be depicted as aligning with the flight director symbology if the symbology is depicted on a tactical display unit.

In another embodiment, a module is disclosed for presenting a flight director-dependent HITS pathway. The module comprises a processor and input and output communication interfaces for facilitating the receipt of data from at least one data source and the providing of a HITS image data set to a display system. A processor configured to generate a HITS data set representative of such a pathway using the flight plan data and the flight director data. In another embodiment of the module, flight plan data received by the processor could be HITS pathway data determined independently of the flight director data. In another embodiment, the HITS image data set generated by the processor includes data representative of a flight director symbology such that the proximal end of the HITS pathway may be depicted as aligning with the flight director symbology if the symbology is depicted on a tactical display unit.

In another embodiment, a method is disclosed for presenting a flight director-dependent HITS pathway. The method receives flight plan data and flight director data, generates a HITS data set representative of such a pathway using the flight plan data and the flight director data, and provides the HITS image data set. In another embodiment of the method, flight plan data received by the processor could be HITS pathway data determined independently of the flight director data. In another embodiment, the HITS image data set generated by the processor includes data representative of a flight director symbology such that the proximal end of the HITS pathway may be depicted as aligning with the flight director symbology if the symbology is depicted on a tactical display unit.

BRIEF DESCRIPTION OF THE DRAWINGS

FIG. 3A depicts an exemplary illustration of a flight director on a tactical display unit.

DETAILED DESCRIPTION OF THE INVENTION

In the following description, several specific details are presented to provide a thorough understanding of the embodiments of the invention. One skilled in the relevant art will recognize, however, that the invention can be practiced without one or more of the specific details, or in combination with other components, etc. In other instances, well-known implementations or operations are not shown or described in detail to avoid obscuring aspects of various embodiments of the invention.

Figure 1:
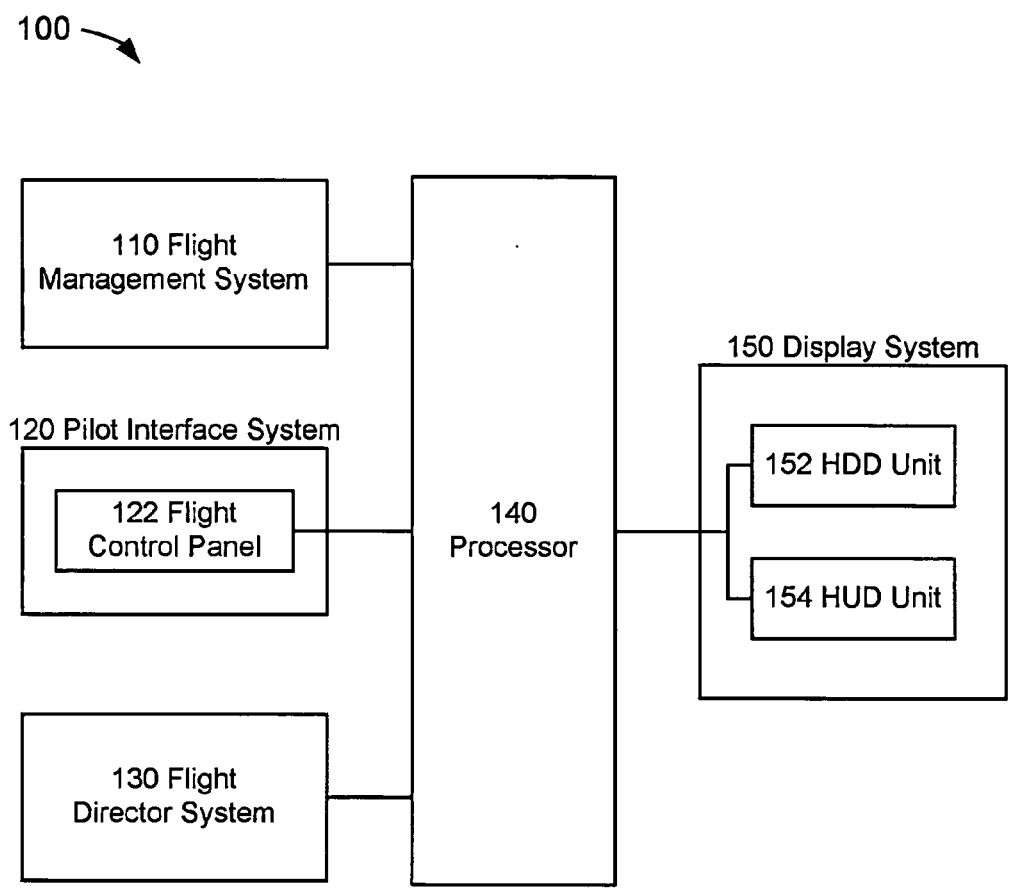
FIG. 1 depicts a block diagram of a flight director-dependent HITS pathway presenting system.

FIG. 1 depicts a block diagram of a flight director-dependent highway in the sky ("HITS") pathway presenting system suitable for implementation of the techniques described herein. The flight director-dependent HITS pathway presenting system 100 of an embodiment of FIG. 1 includes flight management system ("FMS") 110, a pilot interface system 120, a flight director ("FD") system 130, a processor 140, and display system 150.

In an embodiment of FIG. 1, an FMS 110 may perform a variety of functions performed to help the crew in the management of the flight; these functions are known to those skilled in the art. These functions could include receiving a flight plan and constructing a lateral and vertical flight plan from the flight plan. A pilot could create a flight plan from waypoints stored in a database or select a flight plan stored in a database of the FMS 110. Also, a flight plan may be modified at any time. As embodied herein, aircraft could mean any vehicle which is able to fly through the air or atmosphere including, but not limited to, lighter than air vehicles and heavier than air vehicles, wherein the latter may include fixed-wing and rotary-wing vehicles.

In a lateral flight plan, the FMS could perform many functions including, but not limited to, navigational computations, radio navigation aids selections, and providing lateral flight information which could maintain the aircraft along the flight plan from takeoff to approach. In a vertical flight plan, an FMS could compute an optimum speed at each point, other characteristic speeds, and the aircraft weight and center of gravity. Then, it could compute predictions along the flight plan based on these speeds and weight. It could also provide vertical flight information in reference to such predictions. Other miscellaneous performance computations are also made. Computations and underlying algorithms performed by an FMS 110 are known to those skilled in the art.

A pilot or flight crew may initialize an FMS including, but not limited to, the selection of a flight plan, where such flight plan could provide the basis for all computations and displays. A flight plan may be composed of various lateral and vertical elements that may be defined during initialization, and may be defined from navigation data stored in an FMS database.

Lateral elements of a flight plan could include origin airport and runway; a departure procedure ("DP") that may include, but is not limited to, a standard instrument departure ("SID"); an enroute transition; enroute airways and waypoints; an arrival procedure that may include, but is not limited to, an enroute transition, a standard terminal arrival route ("STAR") procedure, a STAR-approach transition, an approach procedure, a missed approach procedure, and a holding procedure; and a flight plan to an alternate airport. Such procedures may be defined by various legs and waypoints between legs.

Vertical elements could include a takeoff altitude which may include, but is not limited to, a thrust reduction and/or acceleration altitudes; altitude constraints at one or more waypoints located along the flight path; vertical speed and/or flight path angle constraints at one or more waypoints located along the flight plan; speed constraints at one or more waypoints along the flight plan; climb and descent speed limits; climb and descent step legs; and cruise flight levels. A vertical element could also include a cost index for the flight plan, a parameter that may determine flight time cost in units of fuel flow for providing fuel cost versus time cost information. The cost index could include a scale of optimization, where a low cost index may be associated with optimizing fuel consumption and a high cost index may be associated with optimizing time.

As noted above, a flight plan may be changed or revised at any time after initialization. For lateral elements, waypoints could be inserted or deleted, holding procedures could be inserted or modified, legs to fly directly to waypoints may be inserted, a DP or STAR procedure may be modified or introduced into the flight plan, the destination or alternate airport may be changed, and/or an offset path could be created to avoid hazardous meteorological conditions. For vertical elements, constraints associated with altitude, vertical speed, flight path angle, and speed between waypoints could be inserted, modified, or deleted; climb and descent speeds could be inserted, modified, or deleted as well as climb and descent step legs. Cruise flight levels and a cost index could be modified.

With respect to vertical elements, an FMS 110 may compute various speeds or mach numbers for the purpose of predicting time and fuel consumption. The predictions made by the FMS 110 may be based on phase of flight profiles using assumptions based on pre-computed allowances and may not take into account an actual flight profile established when an autopilot is engaged. The following brief discussion regarding the use of prediction profiles for the various phases of flight is provided for the purpose of illustration only and not of limitation.

A prediction profile of a take-off phase of flight may assume an aircraft is flown with maximum take-off thrust at a specific speed until a thrust reduction altitude is reached. This could be followed with a prediction profile assuming the aircraft is flown with maximum climb thrust at a specific setting is used until an acceleration altitude is reached. Then, a prediction profile of a climb phase may assume the aircraft is flown with maximum climb thrust from the acceleration altitude until a climb speed selected by the pilot or aircrew is reached or the lower of an optimum speed, a climb speed limit, or a speed constraint is reached, thereby satisfying speed limits or constraints imposed upon the climb phase prediction profile; the pilot may select a speed using a device of a pilot interface system 120 as discussed below. As embodied herein, an FMS 110 could receive data input from other aircraft systems including, but not limited to, data representative of one or more flight modes and/or parameters from a pilot interface system 120. In addition, an FMS 110 could provide data representative of a flight plan to other aircraft systems including, but not limited to, an FD system 130 and a processor 140 as discussed herein. Data representative of the flight plan may used as a basis for presenting a highway in the sky on a tactical display unit.

In an embodiment of FIG. 1, a pilot interface system 120 may be a device which allows a pilot to engage an aircraft's autoflight system and to select or choose flight modes and/or parameters. An autoflight system could include, but is not limited to, an FD system 130, an autopilot system, and an autothrottle system.

Figure 2:
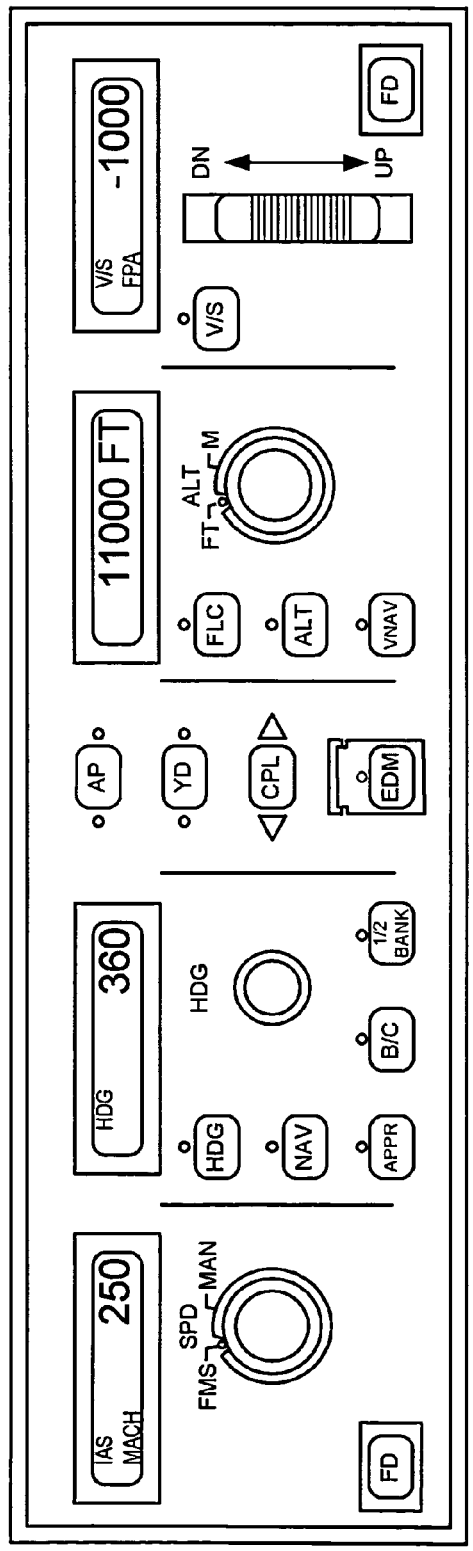
FIG. 2 depicts an exemplary illustration of a flight control panel.

FIG. 2 depicts an exemplary illustration of a flight control panel ("FCP") 122, which could be a device of a pilot interface system 120. It is known to those skilled in the art that an FCP 122 may come in many shapes, sizes, and configurations. FCP 122 depicted in FIG. 2 is provided as an exemplar of a cockpit panel having flight mode and/or parameter selection devices including a knob, pushbutton switches, rotary switches and a thumbwheel. Such devices may be used by the pilot to select or choose the flight mode and/or parameters. Also, such devices may be used to engage an aircraft's autoflight system. As embodied herein, FCP 122 could represent any device of a pilot interface system 120 from which the pilot may choose to make such selection and/or engagement, and although the following discussion will be drawn to an FCP 122, a pilot interface system 120 is not limited to an FCP 122.

FCP 122 depicts a flight mode and/or a parameter selection device associated with lateral and vertical flight modes. As shown in FIG. 2, lateral flight mode selection devices include the knob and switches under the window with the HDG 360 indication ("heading window"). The HDG rotary knob may provide the means with which the pilot may select a heading; the selected heading may appear in the heading window. A heading mode could be engaged by pressing the HDG pushbutton switch, where such engagement may provide the autoflight system with roll guidance information to capture and track the heading selected in the window. A navigation mode could be engaged by pressing the NAV pushbutton switch, where such engagement may provide the autoflight system with roll guidance information to capture and track the lateral commands provided by an FMS 110. An approach mode, backcourse mode, and a half-bank mode could be engaged by pressing the APPR, B/C, and ½ BANK pushbutton switches, respectively, where such engagement may provide the autoflight system with roll guidance information to capture and track a localizer, to capture and track the backcourse of a localizer, and to reduce the roll limits of the system, respectively.

Vertical flight modes and/or parameter selection devices include those switches under the windows with the indications of IAS-MACH 250 ("speed window"), 11000 FT ("altitude window"), and V/S-FPA −1000 ("vertical speed window"). The SPD rotary switch under the speed window may provide the means with which the pilot may select a speed from two sources of speed including, but not limited to, a climb speed. By selecting FMS with the SPD rotary switch, an FMS speed hold mode could be engaged, where the climb speed could be limited to the lower of an optimum speed, a climb speed limit, or a speed constraint imposed by an FMS 110 through the use of the climb phase prediction profile as discussed above. By selecting MAN with the SPD rotary switch, a manual speed hold mode could be engaged, where the climb speed could be selected by a pilot and used by an FMS 110 for prediction purposes; the selected speed parameter may appear in the speed window. A concentric knob may provide the means with which the pilot may select a speed; the selected speed may appear in the speed window. The FD pushbutton switch may enable the depiction of an FD providing vertical and lateral guidance information to a tactical display unit of a display system 150. It should be noted that the indications of IAS and MACH will not normally be displayed simultaneously in the speed window.

The ALT rotary switch under the altitude window may provide the means with which the pilot may select the unit of measurement for altitude, i.e., feet (FT) or meters (M). A concentric knob may provide the means with which the pilot may select an altitude; the selected altitude may appear in the altitude window. A flight level change ("FLC") mode could be engaged by pressing the FLC pushbutton switch, where such engagement may provide the autoflight system with pitch guidance to climb or descend towards the selected altitude at either a preprogrammed reference speed or capturing and tracking the speed indicated in the speed window. An altitude select mode could be engaged by pressing the ALT pushbutton switch, where such engagement may provide the autoflight system with pitch guidance to capture and track the selected altitude. A VNAV mode could be engaged by pressing the VNAV pushbutton switch, where such engagement may provide the autoflight system with pitch guidance provided by a source of vertical guidance including, but not limited to, an FMS 110. By selecting the FLC mode or ALT mode, the autopilot may control the vertical path of the aircraft using the selected modes and not the flight plan computed by the FMS 110 using a prediction profile.

A vertical speed mode could be engaged by pressing the V/S pushbutton switch under the vertical speed window, where such engagement may provide the autoflight system with pitch guidance to hold the vertical speed (or flight path angle if configured with FPA) selected in the window, where the means of selecting the vertical speed is provided with the DN-UP thumbwheel knob. By selecting the V/S parameter, the autopilot may control the vertical path of the aircraft using the selected parameter and not the flight plan computed by the FMS 110 using a prediction profile. The FD pushbutton switch may enable the depiction of an FD providing vertical and lateral guidance information on a second tactical display unit of a display system 150. It should be noted that the indications of V/S and FPA will not normally be displayed simultaneously in the vertical speed window.

The pushbutton switches AP, YD, CPL, and EDM in the center of FCP 122 may provide the means for the pilot to engage the autopilot, yaw damper, a coupling the autopilot with a navigation signal, and an emergency descent mode, respectively.

Returning to FIG. 1, an FD system 130 as embodied herein comprises a system that could provide lateral and vertical guidance to an autoflight system based on data received from other aircraft system(s), panel(s), and/or component(s) including, but not limited to, a FMS 110 and an FCP 122. Lateral and vertical guidance may be provided to the pilot by depicting a flight director (i.e., symbology of a flight director) on a tactical display unit. Also, lateral and vertical guidance may be provided to an autopilot system for controlling the position of control surfaces on the roll, pitch, and/or yaw axes and to an autothrottle system for controlling engine thrust. The determination of guidance data may be computed by an FD system 130 through the use of guidance algorithm(s) by applying the data received from other aircraft systems to the guidance algorithm(s). The knowledge and use of guidance algorithm(s)—and the application of the received data to the guidance algorithm(s)—are known to those skilled in the art.

The position of the FD depicted on a tactical display unit may depend on a pilot's mode selected on an FCP 122; for the purposes of the following discussion, the FD pushbutton switch on an FCP 122 applicable to the display unit has been engaged, thereby enabling the depiction of the FD for providing lateral and vertical guidance. For example, a pilot may want to follow a flight plan of an FMS 110. If so, he or she may engage the NAV pushbutton switch mode for lateral guidance and select the VNAV pushbutton switch for vertical guidance.

With respect to vertical guidance, the FMS 110 may predict the vertical flight path by applying the one of two speeds based on a speed hold mode selected by the pilot using the SPD rotary switch. By selecting MAN with the SPD rotary switch (and assuming a climb path), a selected climb speed could be used by an FMS 110 for prediction purposes. By selecting FMS with the SPD rotary switch, a climb speed could be limited to the lower of an optimum speed, a climb speed limit, or a speed constraint imposed by an FMS 110 through the use of the climb phase prediction profile as discussed above.

After the pilot has made these selections, data representative of the pilot's selections may be provided to an FD system 130. Through the application of this data to guidance algorithms, an FD system 130 may compute and provide lateral and vertical guidance to a tactical display unit of a display system 150. The lateral and vertical guidance may be represented by the horizontal and vertical positioning of the FD on the tactical display unit as computed by an FD system 130, where data representative of FD position may be provided by an FD system 130.

In another example, a pilot may want to follow a lateral flight plan of an FMS 110 but not a vertical flight plan of an FMS 110; instead, the pilot may want to manually select the vertical flight path using a constant vertical speed (or flight path angle) until the altitude indicated in the altitude window of FCP 122 is reached. If so, he or she may engage the NAV pushbutton switch mode for lateral guidance and select the V/S pushbutton switch for vertical guidance and select the vertical speed using the thumbwheel. After the pilot has made these selections, data representative of the pilot's selections may be provided to an FD system 130. Through the application of this data to guidance algorithms, an FD system 130 may compute and provide lateral and vertical guidance to a tactical display unit. The vertical guidance may be represented by the vertical positioning of the FD on the tactical display unit to achieve the selected vertical speed as computed by an FD system 130 until the selected altitude is reached, where data representative of FD position may be provided by an FD system 130.

In another example, a pilot may want to follow a lateral flight plan of an FMS 110 but not a vertical flight plan of an FMS 110; instead, the pilot may want to manually select the vertical flight path using a manually-selected speed. If so, he or she may engage the NAV pushbutton switch mode for lateral guidance and select the FLC pushbutton switch for vertical guidance and select the new altitude using the ALT knob. Also, he or she may select the speed by turning the SPD rotary switch to MAN and selecting the speed with the SPD knob. After the pilot has made these selections, data representative of the pilot's selections may be provided to an FD system 130. Through the application of this data to guidance algorithms, an FD system 130 may compute and provide lateral and vertical guidance to a tactical display unit, where the vertical guidance corresponds to the altitude and manually-selected speed by the pilot. The vertical guidance may be represented by the vertical positioning of the FD on the tactical display unit to achieve the manually-selected speed as computed by an FD system 130 until the selected altitude is reached, where data representative of FD position may be provided by an FD system 130.

In another example, a pilot may want to follow a lateral flight plan of an FMS 110 but not a vertical flight plan of an FMS 110; instead, the pilot may want to manually select the vertical flight path to climb to a different altitude using a speed determined by an FMS 110. If so, he or she may engage the NAV pushbutton switch mode for lateral guidance and select the FLC pushbutton switch for vertical guidance and select the new altitude using the ALT knob. Also, he or she may select the speed by turning the SPD rotary switch to FMS. After the pilot has made these selections, data representative of the pilot's selections may be provided to an FD system 130. Through the application of this data to guidance algorithms, an FD system 130 may compute and provide lateral and vertical guidance to a tactical display unit, where the vertical guidance corresponds to the altitude selected by the pilot and FMS-selected speed. The vertical guidance may be represented by the vertical positioning of the FD on the tactical display unit to achieve the FMS-selected speed as computed by an FD system 130 until the selected altitude is reached, where data representative of FD position may be provided by an FD system 130.

Returning to FIG. 1, a processor 140 may be any electronic data processing unit which executes software or source code stored, permanently or temporarily, in a digital memory storage device or computer-readable media (not depicted herein) including, but not limited to, RAM, ROM, CD, DVD, hard disk drive, diskette, solid-state memory, PCMCIA or PC Card, secure digital cards, and compact flash cards. A processor 140 may be driven by the execution of software or source code containing algorithms developed for the specific functions embodied herein. Common examples of electronic data processing units are microprocessors, Digital Signal Processors (DSPs), Programmable Logic Devices (PLDs), Programmable Gate Arrays (PGAs), and signal generators; however, for the embodiments herein, the term processor is not limited to such processing units and its meaning is not intended to be construed narrowly. For instance, a processor could also consist of more than one electronic data processing units. As embodied herein, a processor 140 could be a processor(s) used by or in conjunction with any other aircraft system, panel, module, and/or component of the aircraft including, but not limited to, a processor(s) existing in an FMS 110, a pilot interface system 120, an FD system 130, a display system 150, or any combination thereof.

A processor 140 may receive input data from various system(s), panel(s), module(s) and/or component(s) including, but not limited to, an FMS 110, a pilot interface system 120, and an FD system 130. Such inputs could include, but are not limited to, data representative of the flight plan provided by an FMS 110 and data representative of FD position from an FD system 130. A processor 140 may be electronically coupled to systems and/or sources to facilitate the receipt of input data; as embodied herein, operatively coupled may be considered as interchangeable with electronically coupled. A processor 140 may provide output data to various systems and/or units including, but not limited to, a display system 150. A processor 140 may be electronically coupled to systems and/or units to facilitate the providing of output data. It is not necessary that a direct connection be made; instead, such receipt of input data and the providing of output data could be provided through a data bus or through a wireless network.

A display system 150 may include, but are not limited to, one or more tactical display unit(s) comprising an HDD unit 152 and/or a HUD unit 154. An HDD unit 152 and/or a HUD unit 154 may display image from data produced by one or more vision systems such as, but not limited to, a synthetic vision system ("SVS"), an enhanced vision system ("EVS"), or a combined SVS-EVS. An HDD unit 152 is typically a unit mounted to an aircraft's flight instrument panel located in front of a pilot and below the windshield and the pilot's field of vision, and a HUD unit 154 provides tactical information to the pilot or flight crew, in the pilot's forward field of view through the windshield, eliminating transitions between head-down and head-up flying.

FIG. 3 depicts an exemplary illustration of an image on a tactical display unit 160 depicting an electronic artificial horizon with symbology providing tactical flight information. Although it may resemble a classic electronic primary flight display ("PFD") that provides a blue/brown sky/ground artificial horizon, the tactical display unit as embodied herein includes any HDD unit 152 and/or a HUD unit 154 that could present or depict synthetic and/or enhanced sky/terrain artificial horizon generated by vision systems including, but not limited to, an SVS, an EVS, and/or a combined SVS-EVS. Although the discussion herein will be drawn to illustrations using a tactical display unit resembling a PFD, the embodiments herein are not limited solely to PFDs but include any display unit that could provide tactical flight information.

As embodied herein, tactical flight information displayed on a tactical display unit could be information relevant to the instant or immediate control of the aircraft, whether the aircraft is in flight or on the ground. As shown in FIG. 3A, a tactical display unit could display the same information found on a PFD, such as "basic T" information (i.e., airspeed, attitude, altitude, and heading). Also, a tactical unit display could display an FD 162 and a flight path vector 164. As shown in FIG. 3A, the FD 162 symbology is depicted as a rectangle (specifically, a square), and the flight path vector 164 symbology is depicted as an airplane. Those skilled in the art understand that an FD and flight path vector may be depicted or configured using other symbologies comprising different shapes, colors and/or forms including, but not limited to, a donut, a bull's-eye, horizontal and/or vertical bars, or wings. The embodiments herein are not limited solely to the depicted symbologies but include any symbology that could provide the horizontal and/or vertical guidance on an FD or indicate the real-time flight path of a flight path vector.

Figure 3B:
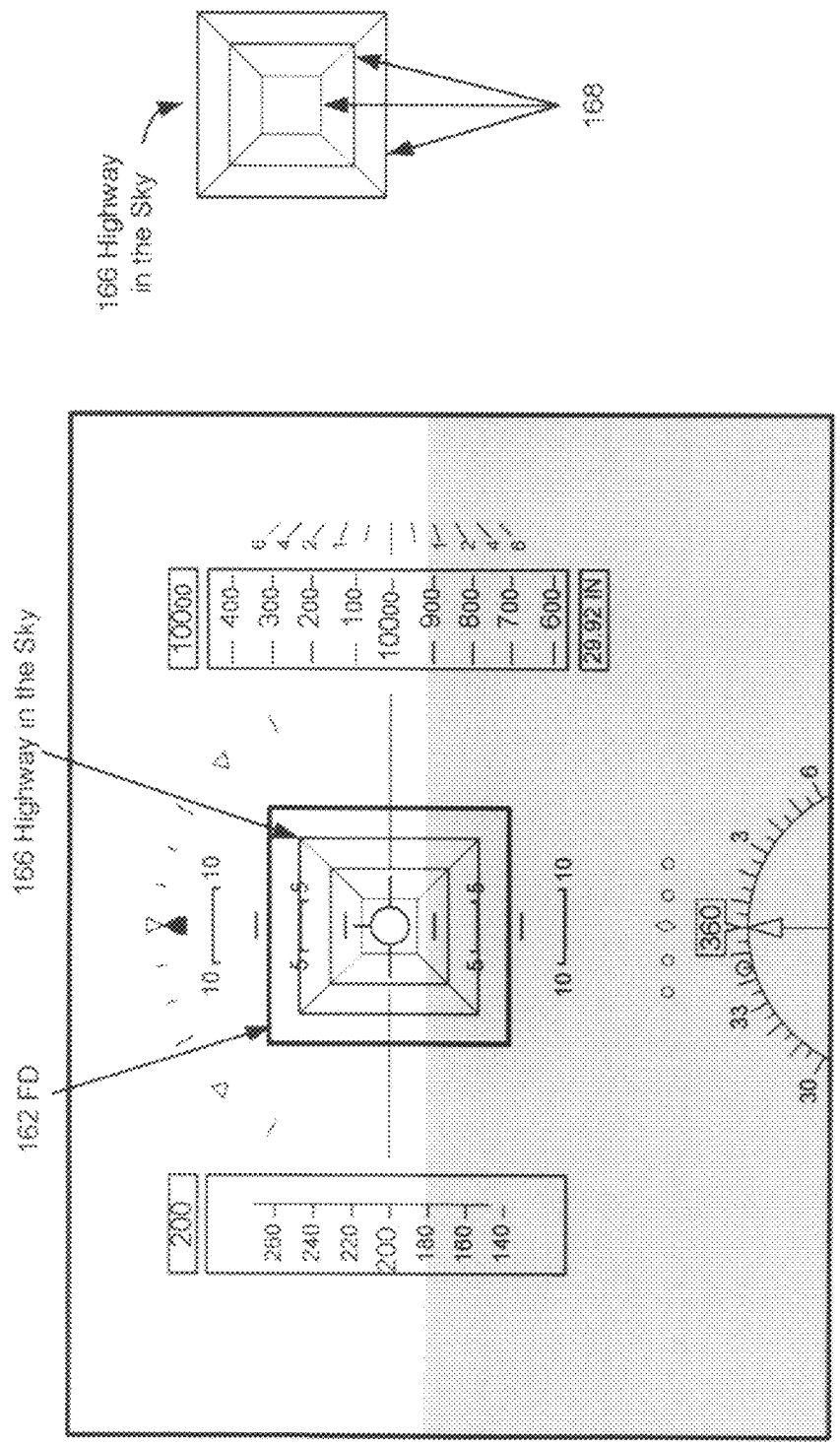
FIG. 3B depicts an exemplary illustration of a HITS pathway on a tactical display unit.

An embodiment of FIG. 3B provides an exemplary illustration of an FD 162 and a HITS 166 depicted on a tactical unit display. A HITS or flight pathway could provide course guidance to the pilot using a perspective view of a path (e.g., flight plan) through the air. A HITS pathway may be configured for more than one type of design. As illustrated in FIG. 3B, the HITS pathway 166 has been configured as sequentially-connected rectangles 168 (specifically, squares) for depicting a flight pathway or tunnel. Although the dimensions of each square may differ, they could represent the same dimensions of airspace as the pathway extends outwardly from the aircraft and towards the horizon (or into the scene in front of the aircraft); as such, the pathway appears to narrow or taper as the squares appear to become smaller, thereby providing the appearance of flight into a tunnel. As embodied herein, the largest square may represent a proximal end of a HITS pathway closest to the aircraft, and the smallest square may represent a distal end of a HITS pathway farthest from the aircraft. For the purposes of the examples of a HITS pathway provided herein, the longitudinal distance between successive squares will be assumed to be 2 NM per square; that is, the longitudinal scale of the HITS pathway will be assumed to be 2 NM per square although a manufacturer or end-user may configure the distance to be different than this example. As such, the use of three squares representing a HITS pathway will create an assumed HITS pathway projection of 4 NM outwardly from the aircraft or into the scene.

A plurality of HITS pathway depictions is available or configurable to a manufacturer or end-user. Those skilled in the art will appreciate the ability and ease with which executable software code may be reprogrammed or modified by a manufacturer or end-user to facilitate a configuration of a HITS pathway depiction selected by a manufacturer or end-user without affecting or expanding the scope of the embodiments discussed herein. In the following paragraphs, other examples of criteria and performance factors are provided to illustrate the ability with which a manufacturer or end-user may define a HITS pathway depiction as embodied herein. These illustrations are intended to provide examples of a HITS pathway, and are not intended to provide a limitation or an exhaustive list of the embodiments discussed herein.

It should be noted that in order to distinguish between FD 162 and HITS pathway 168 in the remaining discussion, FD 162 will be depicted herein with thicker border lines, and the HITS pathway 168 will be depicted with thinner border lines having lighter shades. Furthermore, although the discussion herein will be drawn to a HITS pathway design of sequentially-connected squares, the embodiments herein are not limited to such design but include any design which depicts a HITS pathway for providing flight plan or course guidance such as, but not limited to, a sequence of circles or polygons either connected or not, a sequence of goal posts either connected or not, a sequence of paving stones either connected or not, or a two- or three-dimensional tunnel design comprising a circular, rectangular, or polygonal cross-section. The generation of HITS pathway data and depiction of a HITS pathway on a tactical display unit are known to those skilled in the art A plurality of symbologies may be depicted on an HDD unit 152 and/or HUD unit 154 besides those provided in the drawings of FIG. 3. Although not depicted in the drawings of FIG. 3, a tactical display unit may also depict a plurality of indications or information including, but not limited to, flight route, selected magnetic heading, actual magnetic track, selected airspeeds, selected altitudes, altitude barometric correction setting, vertical speed displays, flight path angle and drift angles, limiting and operational speeds, mach number, radio altitude and decision height, final approach trajectory deviations, and marker indications. Those skilled in the art understand that a tactical display unit is typically designed to provide flexible symbology configurations which may be tailored to the desired configuration specified by a buyer or user of the aircraft. Because the indications or information shown in the drawings of FIG. 3 are well-known to those skilled in the art, a discussion of the other information is not provided herein.

The advantages and benefits of the embodiments discussed herein may be illustrated by showing examples of the relationship between the location of an FD and the location of a HITS pathway depicted on a tactical display unit, which may determine the presentation of the location of a HITS pathway in a flight director-dependent HITS pathway presenting system 100. Each of the drawings of FIG. 4 contains a profile of points along a vertical flight plan and a tactical display unit providing indications corresponding to each point. The vertical flight plan has been predicted by an FMS 110, where the flight plan will maintain an altitude of 10,000' until reaching a waypoint 202, then climb to the next altitude constraint of the flight plan of 15,000'. There are five points shown on the profile, and each drawing of the tactical display unit will illustrate the depiction of an FD and HITS pathway associated with each point along the vertical flight path of the profile.

It will be assumed for the drawings of FIG. 4 that the pilot has elected to follow a flight plan of an FMS 110 by selecting a VNAV pushbutton switch on an FCP 122 for vertical guidance; for the purpose of this example, there will be no change to the lateral flight plan, i.e., the aircraft will continue on its current heading. Also, the pilot has elected to climb at a speed limit imposed by an FMS 110 by selecting FMS with the SPD rotary switch. For the purposes of this example, the FMS will use an optimum speed of 200 knots, and the autopilot and autothrottle systems have been engaged to maintain the proper path angle and thrust output required for a constant climb at 200 knots.

Figure 4A:
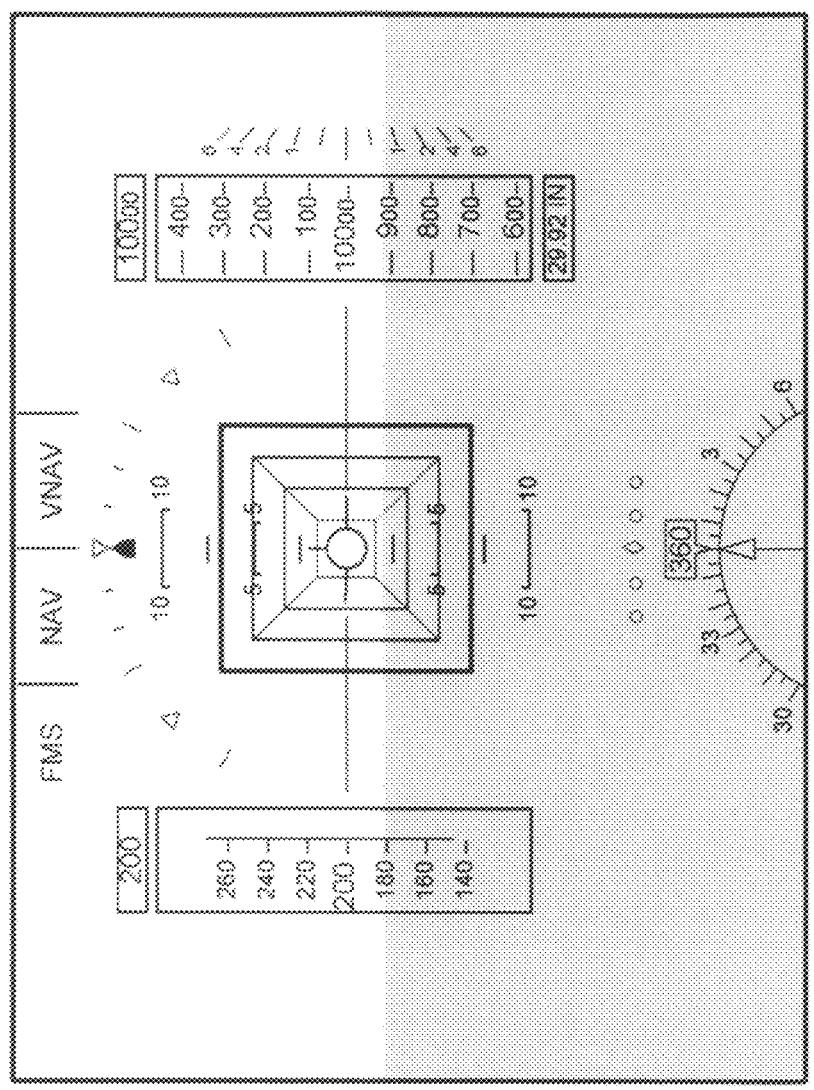
FIG. 4A illustrates a profile of points along a vertical flight plan defined by an FMS and tactical display unit indications corresponding to a first point.
Figure 4A:
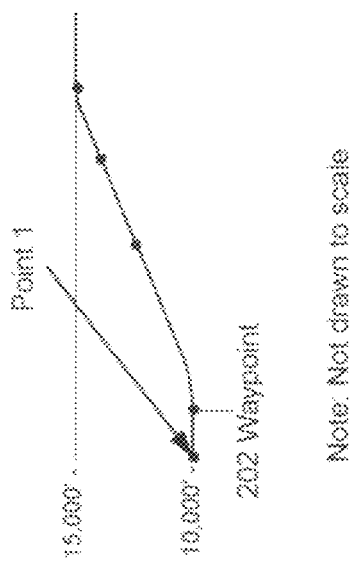

As shown in FIG. 4A, the position of the aircraft is at point 1 and approaching waypoint 202; the distance between point 1 and waypoint 202 is assumed to be 6 NM. As shown on the tactical display unit, the aircraft is operating in level flight (as indicated by a flight path vector that is level with a horizon line) at an altitude of 10,000' at a speed of 200 knots. The indication of a HITS level path corresponding to the predicted level path is depicted, where the location of the proximal end of the HITS pathway may be aligned with the location of the FD depicted on the tactical display unit as computed by an FD system 130 based, in part, on input data representative of the selection made by the pilot on the FCP 122 to use the FMS-predicted flight plan for vertical guidance; the location of the distal end of the HITS pathway may be aligned with a location along the level path of the flight plan at a distance corresponding to the scale of the HITS pathway projected outwardly from the aircraft or into the scene in front of the aircraft.

Figure 4B:
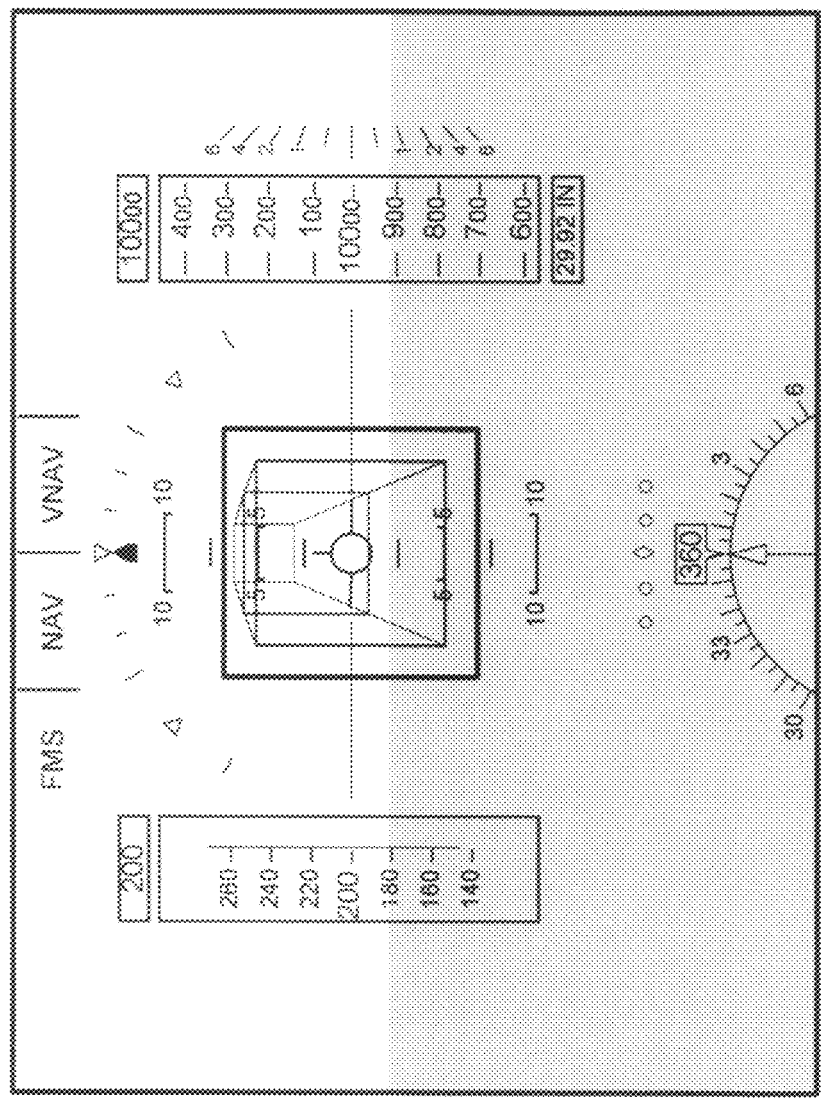
FIG. 4B illustrates a profile of points along a vertical flight plan defined by an FMS and tactical display unit indications corresponding to a second point.
Figure 4B:
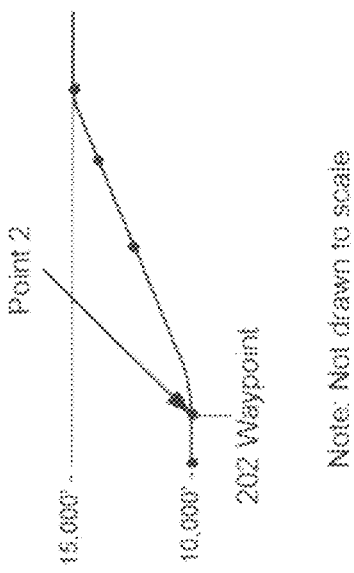

As shown in FIG. 4B, the aircraft has arrived at point 2 and/or waypoint 202. The aircraft is still operating in level flight at an altitude of 10,000' at a speed of 200 knots, but will transition to a climb after passing the waypoint 202. The indication of a HITS climb path corresponding to the predicted climb path is depicted, where the location of the proximal end of the HITS pathway may be aligned with the location of the FD, and the location of the distal end of the HITS pathway may be aligned with a location along the climb path of the flight plan at a distance corresponding to the scale of the HITS pathway.

Figure 4C:
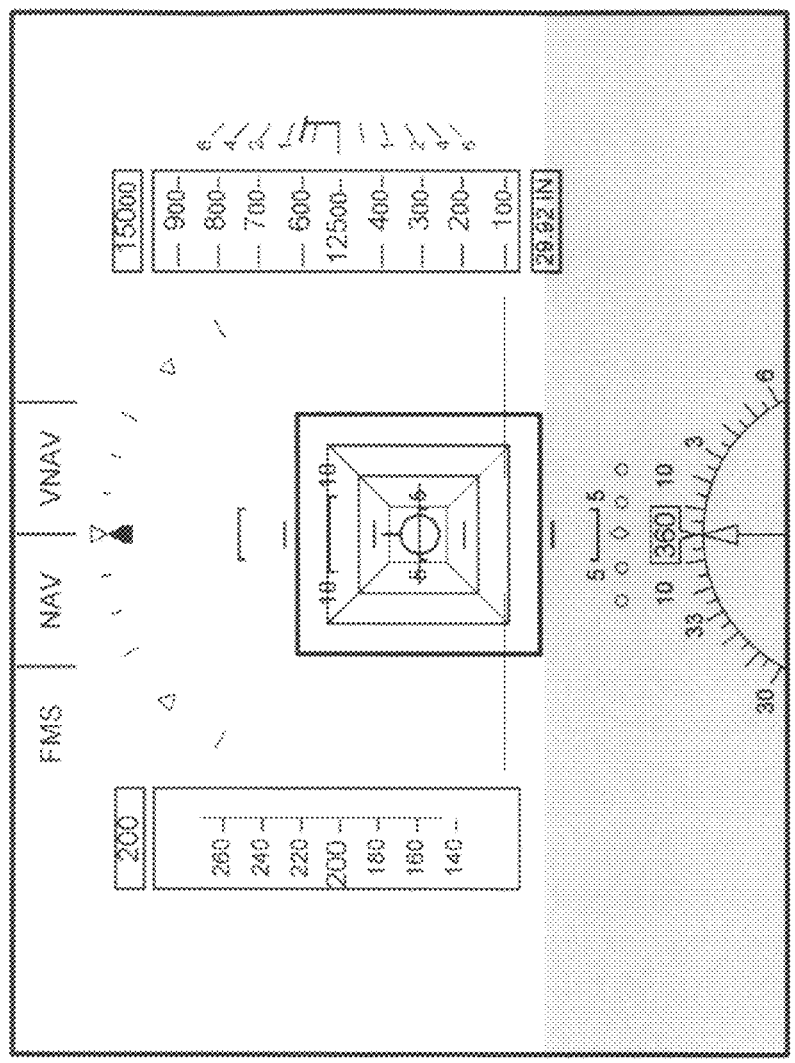
FIG. 4C illustrates a profile of points along a vertical flight plan defined by an FMS and tactical display unit indications corresponding to a third point.
Figure 4C:
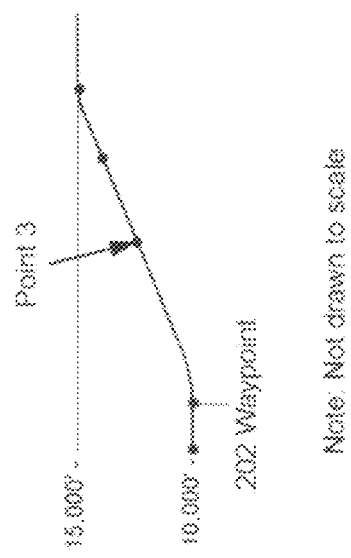

As shown in FIG. 4C, the aircraft has arrived at point 3 and approaching an altitude constraint of 15,000'; the distance between point 3 and the altitude constraint is assumed to be 6 NM. The aircraft is climbing at 750 feet per minute and passing through an altitude of 12,500' at a speed of 200 knots; although not depicted, an FD system 130 has commanded the autothrottle to increase thrust to an applicable setting that will sustain the speed of 200 knots. The indication of a HITS climb path corresponding to the predicted climb path is depicted, where the location of the proximal end of the HITS pathway may be aligned with the location of the FD, and the location of the distal end of the HITS pathway may be aligned with a location along the climb path of the flight plan at a distance corresponding to the scale of the HITS pathway.

Figure 4D:
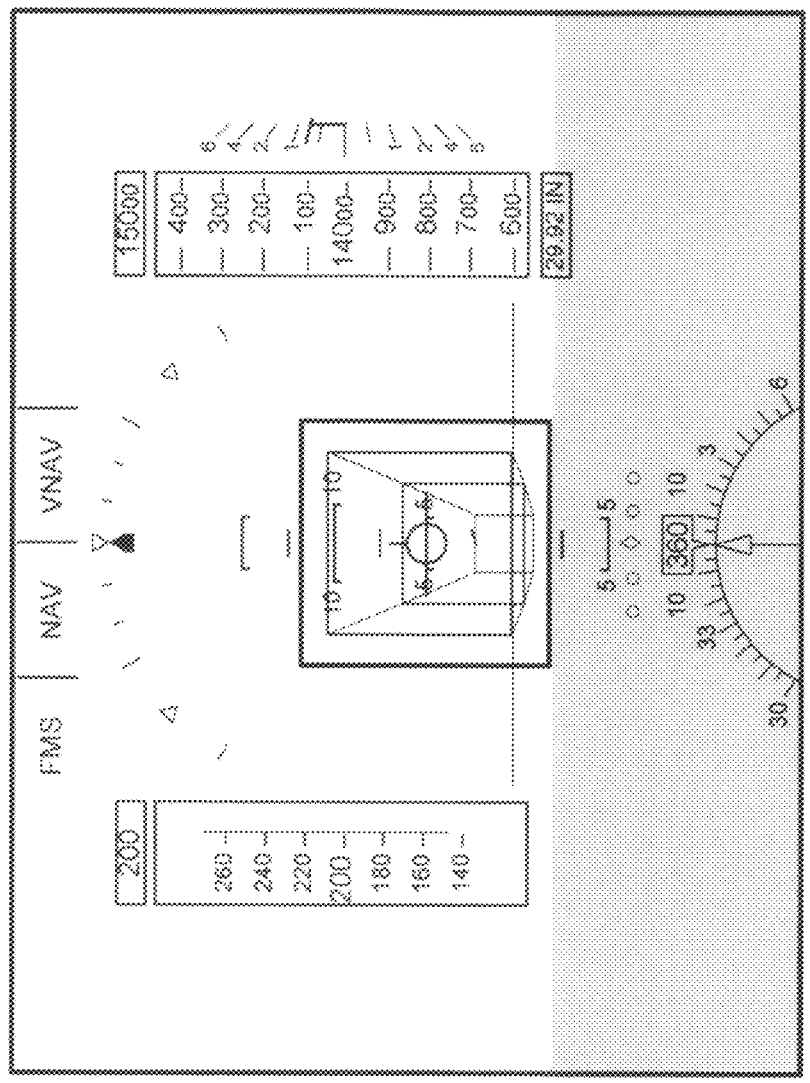
FIG. 4D illustrates a profile of points along a vertical flight plan defined by an FMS and tactical display unit indications corresponding to a fourth point.
Figure 4D:
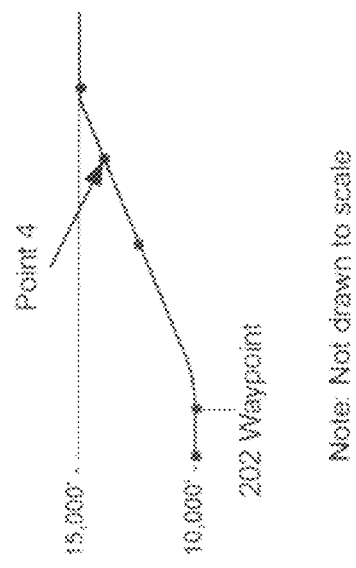

As shown in FIG. 4D, the aircraft has arrived at point 4 and approaching an altitude constraint of 15,000'. The aircraft is climbing at 750 feet per minute and passing through an altitude of 14,000' at a speed of 200 knots. The indication of a HITS climb path corresponding to the predicted climb path is depicted, where the location of the proximal end of the HITS path may be aligned with the location of the FD, and the location of the distal end of the HITS pathway may be aligned with a location along the level path of the flight plan at a distance corresponding to the scale of the HITS pathway.

Figure 4E:
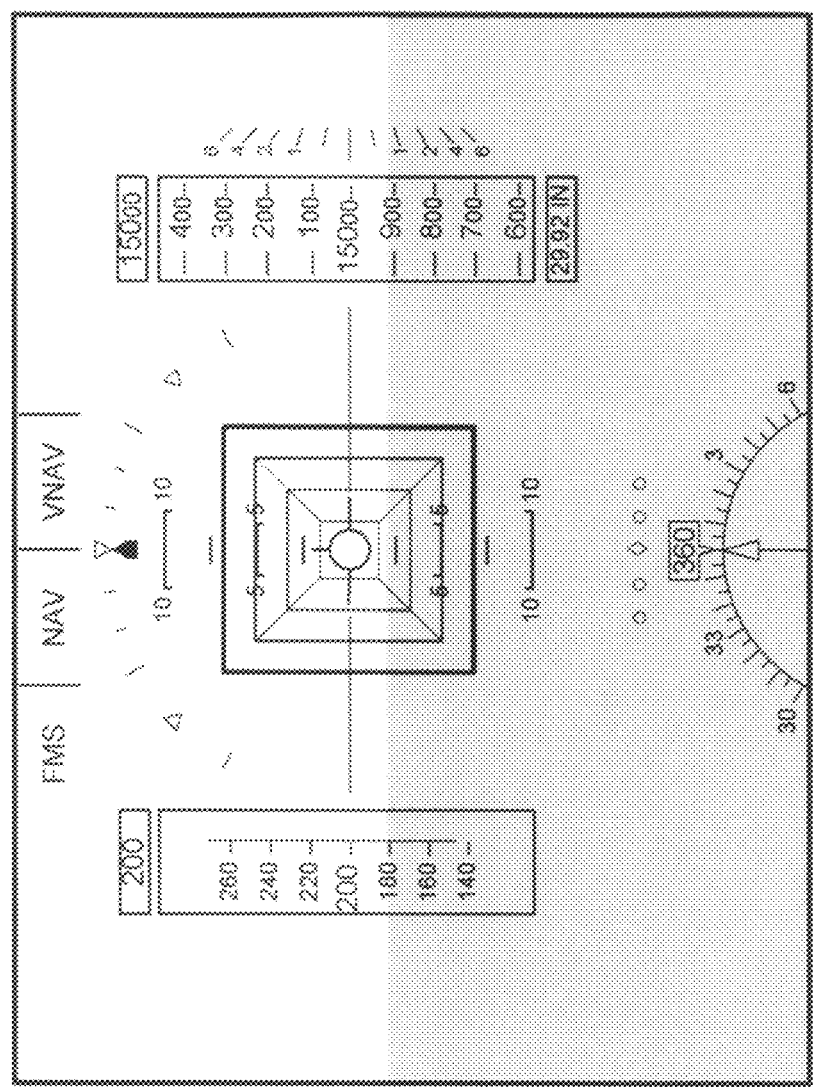
FIG. 4E illustrates a profile of points along a vertical flight plan defined by an FMS and tactical display unit indications corresponding to a fifth point.
Figure 4E:
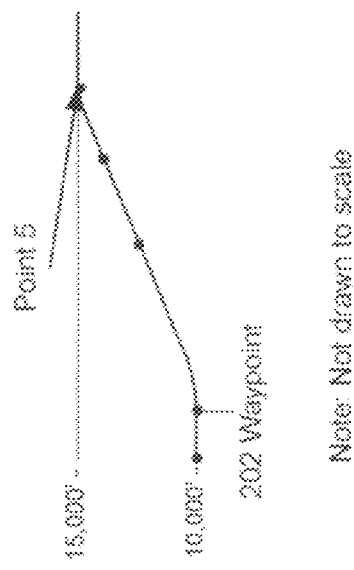

As shown in FIG. 4E, the aircraft has arrived at point 5. The aircraft is operating in level flight at an altitude of 15,000' and a speed of 200 knots. The indication of a HITS climb path corresponding to the predicted climb path is depicted, where the location of the proximal end of the HITS path may be aligned with the location of the FD, and the location of the distal end of the HITS pathway may be aligned with a location along the level path of the flight plan at a distance corresponding to the scale of the HITS pathway.

Similar to the drawings of FIG. 4, each of the drawings of FIG. 5 contains a profile of points along a vertical flight plan and a tactical display unit providing indications corresponding to each point. Also, the vertical flight plan of the drawings of FIG. 4 will also be provided to compare the differences in paths between the two vertical flight plans. The vertical flight plan has been predicted by the pilot, where the flight plan will maintain an altitude of 10,000' until reaching a waypoint 202, then climb to the next altitude constraint of the flight plan of 15,000'; the pilot plans to climb at a greater rate than that predicted by an FMS 110 in the drawings of FIG. 4. This is indicated by noting that the pilot-predicted flight plan is steeper than the FMS-predicted flight plan (shown above the pilot-predicted flight plan). There are six points shown on the profile, and each drawing of tactical display unit will illustrate the depiction of an FD and HITS associated with each point along the vertical flight path of the profile.

It will be assumed for the drawings of FIG. 5 that the pilot has elected to manually follow a flight plan by initially selecting an ALT pushbutton switch on an FCP 122 for vertical guidance; for the purpose of this example, there will be no change to the lateral flight plan, i.e., the aircraft will continue on its current heading. Also, the pilot has selected to climb at a speed limit of 200 knots by selecting MAN with the SPD rotary switch. For the purposes of this example, the FMS will use an optimum speed of 200 knots, and the autopilot and autothrottle systems will not be engaged to maintain the proper path angle and thrust output to maintain a constant climb at a constant speed.

Figure 5A:
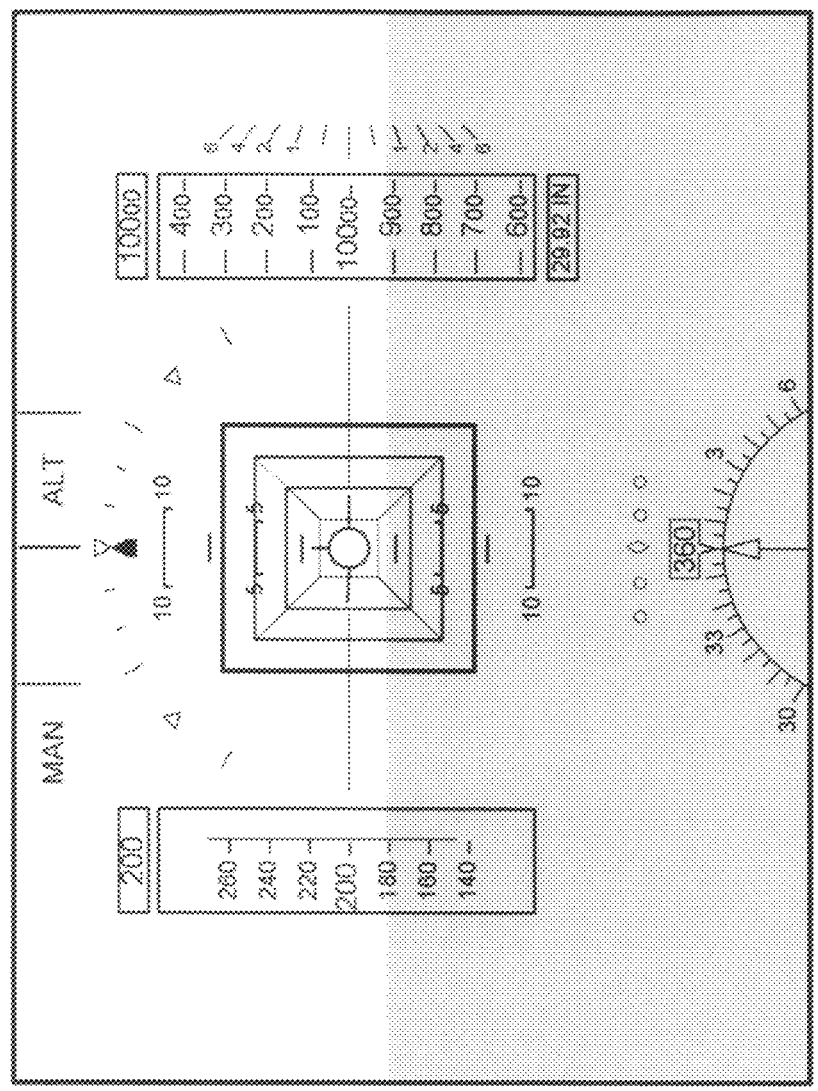
FIG. 5A illustrates a profile of points along a second vertical flight plan defined by the pilot and tactical display unit indications corresponding to a first point.
Figure 5A:
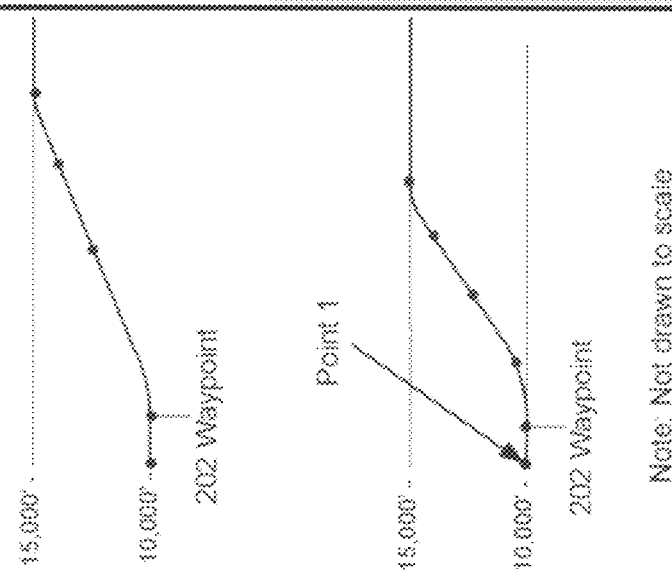

As shown in FIG. 5A, the position of the aircraft is at point 1 and approaching waypoint 202; the distance between point 1 and waypoint 202 is assumed to be 6 NM. As shown on the tactical display unit, the aircraft is operating in level flight (as indicated by a flight path vector that is level with a horizon line) at an altitude of 10,000' at a speed of 200 knots. The indication of a HITS level path corresponding to the pilot-predicted level path is depicted, where the location of the proximal end of the HITS pathway may be aligned with the location of the FD depicted on the tactical display unit as computed by an FD system 130 based, in part, on input data representative of the ALT selection made by the pilot for vertical guidance; the location of the distal end of the HITS pathway may be aligned with a location along the level path of the flight plan at a distance corresponding to the scale of the HITS pathway projected outwardly from the aircraft or into the scene in front of the aircraft.

Figure 5B:
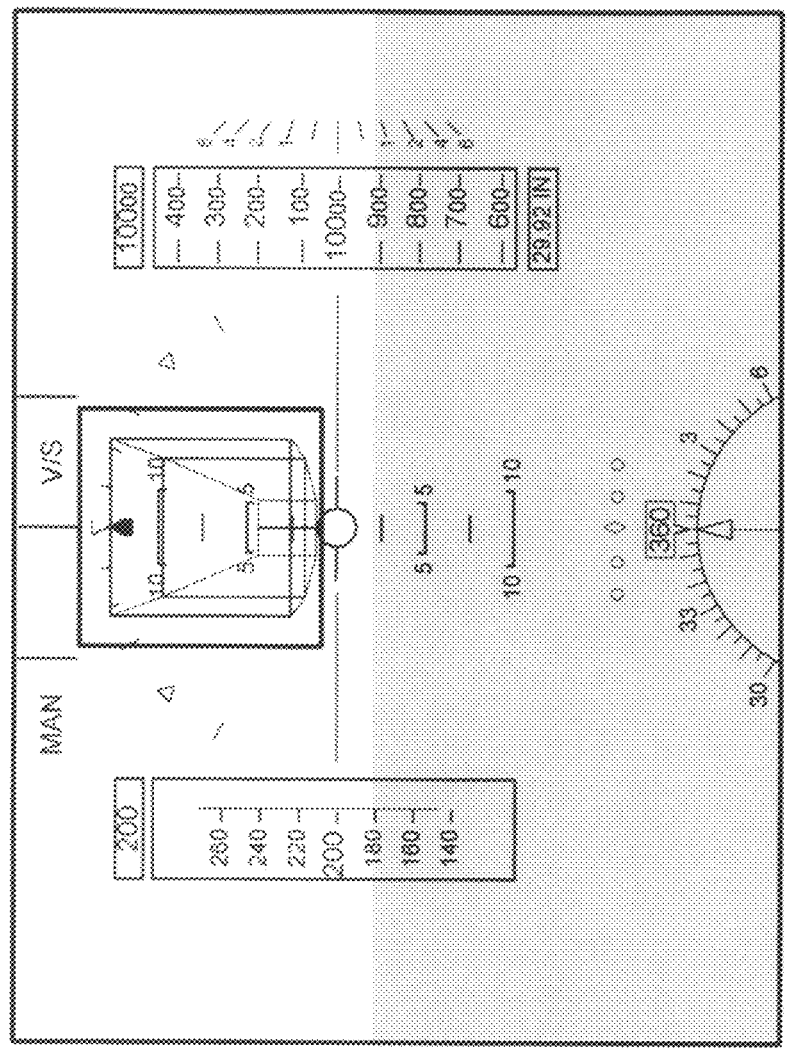
FIG. 5B illustrates a profile of points along a second vertical flight plan defined by the pilot and tactical display unit indications corresponding to a second point.
Figure 5B:
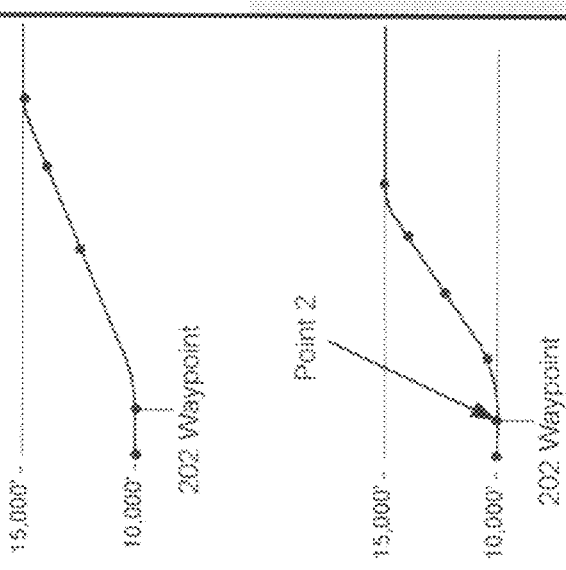

As shown in FIG. 5B, the aircraft has arrived at point 2 and/or waypoint 202. The aircraft is still operating in level flight at an altitude of 10,000' at a speed of 200 knots, but the pilot has selected a V/S pushbutton switch on an FCP 122 for vertical guidance; although it is not shown, the pilot is assumed to have selected UP on the thumbwheel and selected a vertical speed of 1,000 feet per minute on an FCP 122. The indication of a HITS climb path corresponding to the pilot-predicted climb path is depicted based on the selected vertical speed, where the location of the proximal end of the HITS pathway may be aligned with the location of the FD depicted on the tactical display unit as computed by an FD system 130 based, in part, on input data representative of the V/S selection of 1,000 feet per minute made by the pilot for vertical guidance; the location of the distal end of the HITS pathway may be aligned with a location along the climb path of the flight plan at a distance corresponding to the scale of the HITS pathway. Because the autopilot has not been engaged, the pilot will have to manually initiate a climb to capture the vertical guidance provided by the FD. As shown by the flight path vector, the pilot has not begun to initiate a climb.

Figure 5C:
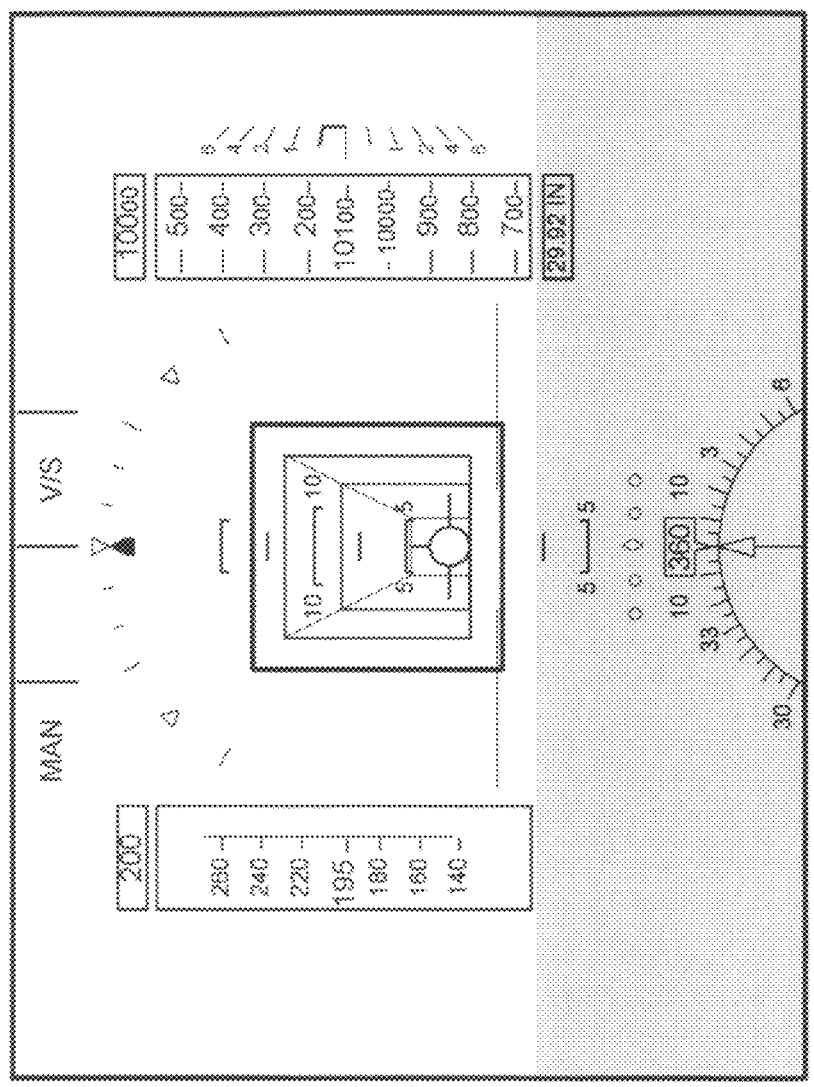
FIG. 5C illustrates a profile of points along a second vertical flight plan defined by the pilot and tactical display unit indications corresponding to a third point.
Figure 5C:
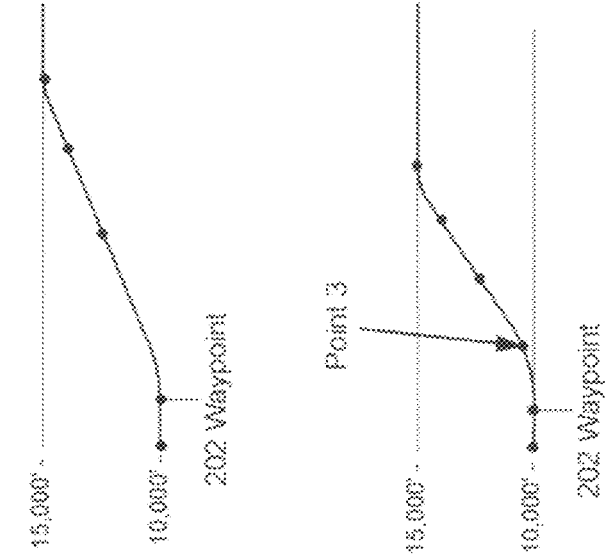

As shown in FIG. 5C, the aircraft has arrived at point 3. As seen, a climb has been initiated as indicated by the 2.5° path angle as indicated by the flight path vector, the altitude of 10,100', a vertical speed of 500 feet per minute, and a speed of 195 knots. The indication of a HITS climb path corresponding to the pilot-predicted climb path is depicted, where the location of the proximal end of the HITS path may be aligned with the location of the FD. When compared with FIG. 5B, the location of the FD of FIG. 5C has been lowered, where such lowering may be result of a computation made by an FD system 130 based, in part, on input data representative of the V/S selection of 1,000 feet per minute made by the pilot for vertical guidance, and the instantaneous vertical speed and path angle. The location of the distal end of the HITS pathway may be aligned with a location along the climb path of the flight plan at a distance corresponding to the scale of the HITS pathway.

Figure 5D:
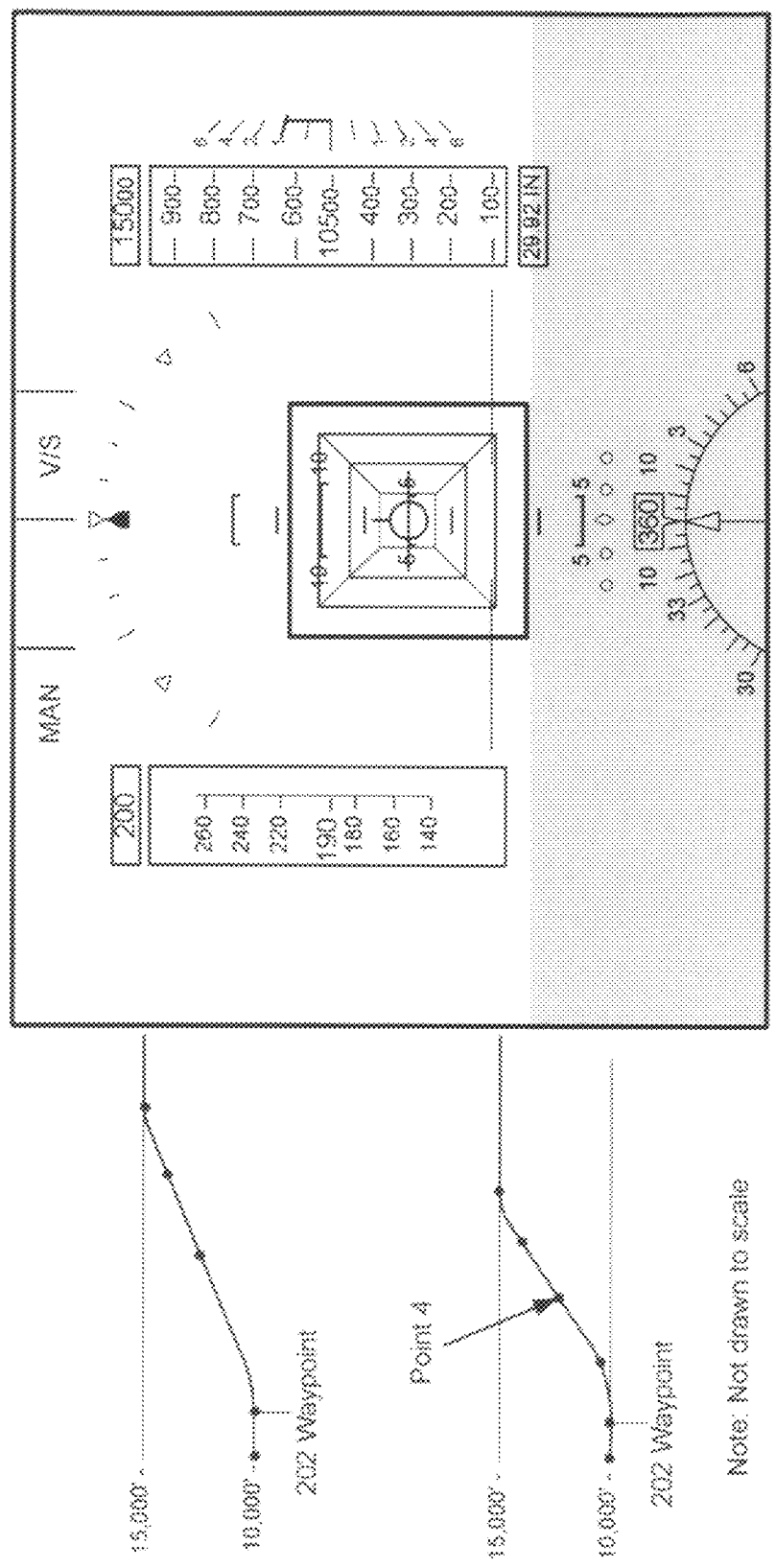
FIG. 5D illustrates a profile of points along a second vertical flight plan defined by the pilot and tactical display unit indications corresponding to a fourth point.

As shown in FIG. 5D, the aircraft has arrived at point 4. As seen, the path angle has been increased to 5.0° as indicated by the flight path vector as the aircraft continues to climb at a vertical speed of 1,000 feet per minute as the aircraft passes through the altitude of 10,500' at a speed of 190 knots. Also, the pilot has selected an altitude of 15,000' in the altitude selecting window of an FCP 122, but V/S pushbutton switch is still engaged; the distance between point 4 and the altitude constraint of 15,000' is assumed to be 6 NM. The indication of a HITS climb path corresponding to the pilot-predicted climb path is depicted, where the location of the proximal end of the HITS path may be aligned with the location of the FD. When compared with FIG. 5C, the location of the FD of FIG. 5D has been lowered, where such lowering may be result of a computation made by an FD system 130 based, in part, on input data representative of the V/S selection of 1,000 feet per minute made by the pilot for vertical guidance, and the instantaneous vertical speed and path angle. The location of the distal end of the HITS pathway may be aligned with a location along the climb path of the flight plan at a distance corresponding to the scale of the HITS pathway.

Figure 5E:
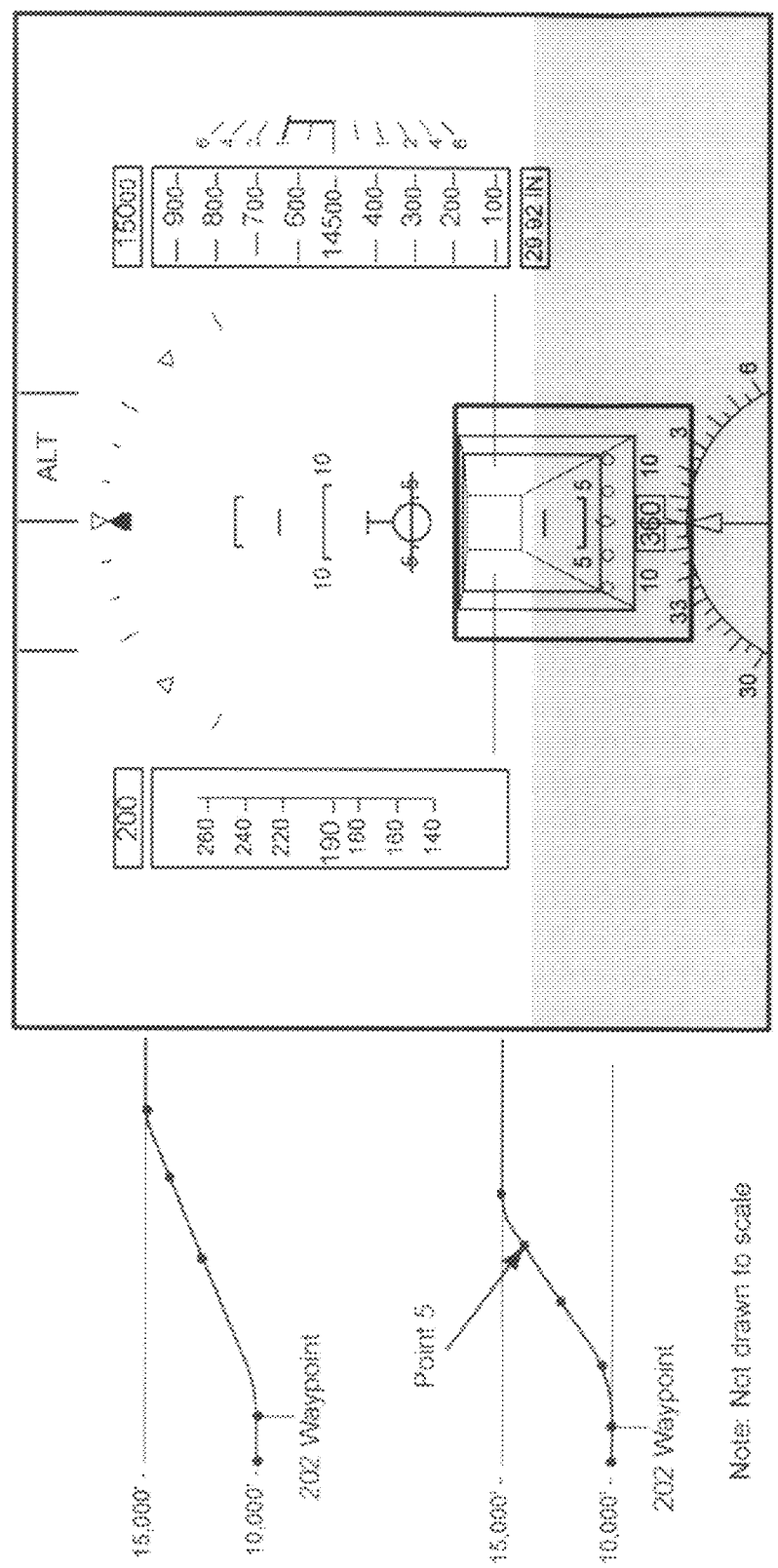
FIG. 5E illustrates a profile of points along a second vertical flight plan defined by the pilot and tactical display unit indications corresponding to a fifth point.

As shown in FIG. 5E, the aircraft has arrived at point 5. As seen, the path angle is steady at 5.0° as indicated by the flight path vector as the aircraft continues to climb at a vertical speed of 1,000 feet per minute as the aircraft passes through the altitude of 14,500' at a speed of 190 knots, but the pilot has selected an ALT pushbutton switch on an FCP 122 for vertical guidance; it should be noted that such a pilot selection may not be necessary if a flight director system has an automatic arming function of an ALT mode. The indication of a HITS climb path corresponding to the pilot-predicted climb path is depicted, where the location of the proximal end of the HITS path may be aligned with the location of the FD. When compared with FIG. 5D, the location of the FD of FIG. 5E has been lowered, where such lowering may be result of a computation made by an FD system 130 based, in part, on input data representative of the ALT selection of 15,000' made by the pilot for vertical guidance, and the instantaneous vertical speed and path angle. The location of the distal end of the HITS pathway may be aligned with a location along the climb path of the flight plan at a distance corresponding to the scale of the HITS pathway. Because the autopilot has not been engaged, the pilot will have to manually initiate a descent to capture the vertical guidance provided by the FD. As shown by the flight path vector, the pilot has not begun to initiate a descent.

Figure 5F:
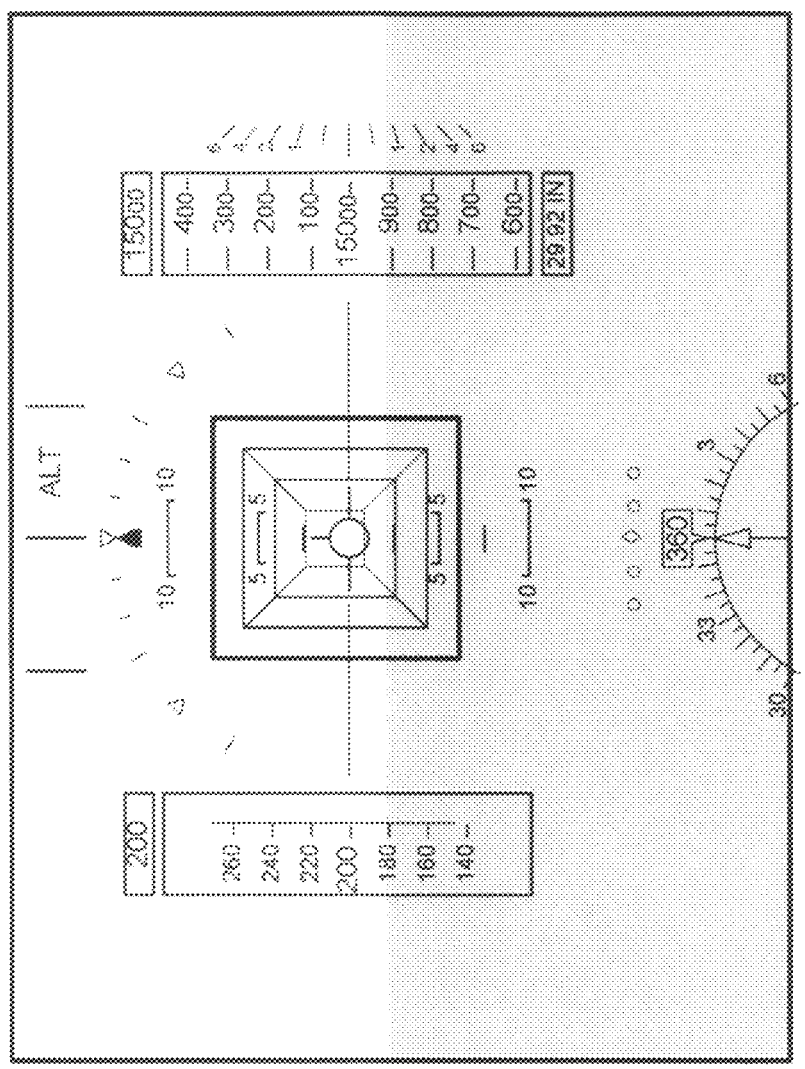
FIG. 5F illustrates a profile of points along a second vertical flight plan defined by the pilot and tactical display unit indications corresponding to a sixth point.
Figure 5F:
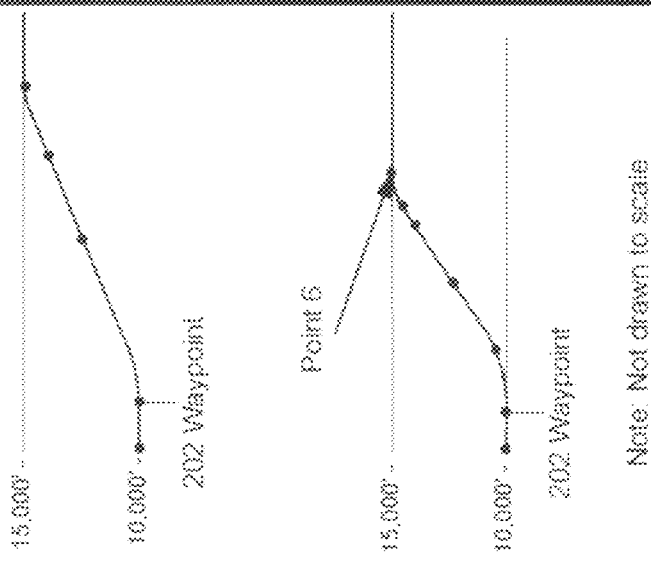

As shown in FIG. 5F, the aircraft has arrived at point 6. The aircraft is operating in level flight at an altitude of 15,000' and a speed of 200 knots; that is, the aircraft has arrived in a cruise segment having a constant altitude. The indication of a HITS climb path corresponding to the pilot-predicted climb path is depicted, where the location of the proximal end of the HITS path may be aligned with the location of the FD. When compared with FIG. 5E, the location of the FD of FIG. 5F has been raised, where such raising may be result of a computation made by an FD system 130 based, in part, on input data representative of the ALT selection of 15,000' made by the pilot for vertical guidance, and the instantaneous vertical speed and path angle. The location of the distal end of the HITS pathway may be aligned with a location along the level path of the flight plan at a distance corresponding to the scale of the HITS pathway.

Figure 6:
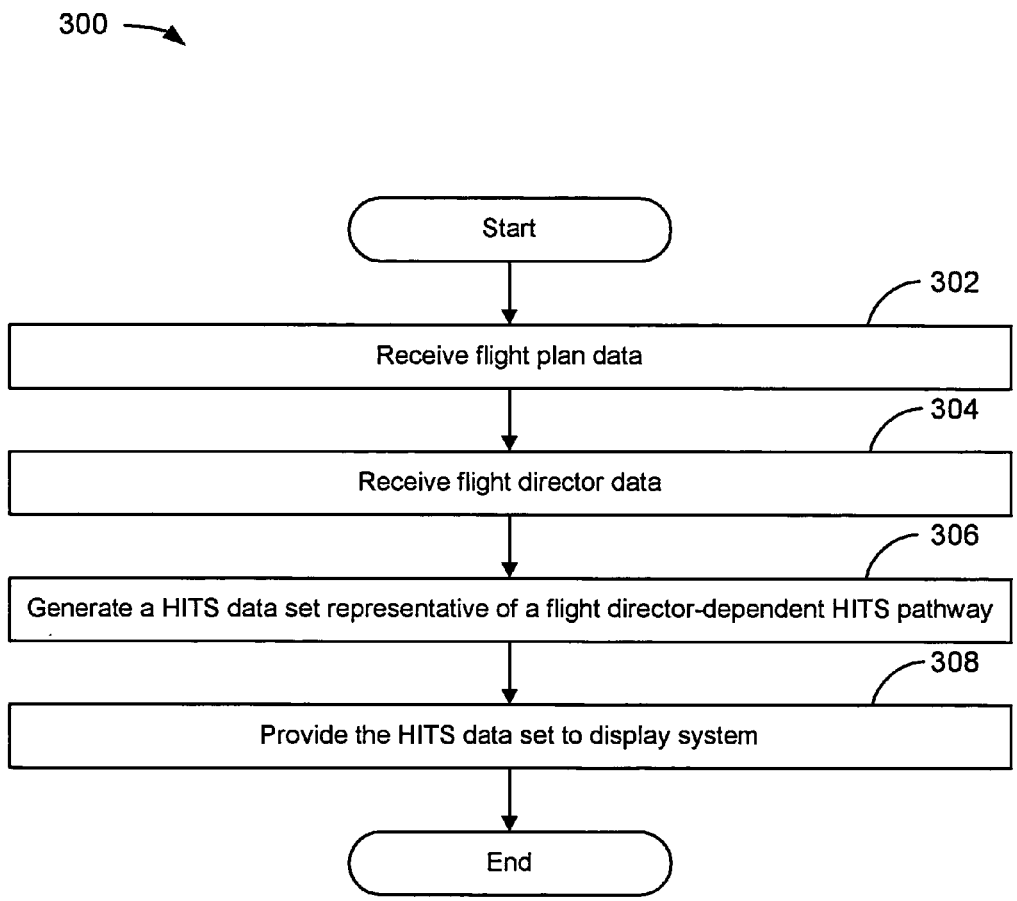
FIG. 6 provides a flowchart illustrating a method for presenting a flight director-dependent HITS pathway on an aircraft display unit.

FIG. 6 depicts a flowchart 300 of an example of a method for presenting a flight director-dependent HITS pathway on an aircraft display unit. The flowchart begins with module 302 with the receiving of flight plan data by a processor 140.

In one embodiment, flight plan data may be provided by a source such as, but not limited to, an FMS 110. As discussed above, vertical and/or horizontal flight plan data may be generated by an FMS 110 using a prediction profile, where such profile may use data representative of a flight mode selected or chosen by a pilot using a device of a pilot interface system 120 such as, but not limited to, an FCP 122. In an alternative embodiment, a source could comprise any device or system that has generated or has been provided with data representative of an existing HITS pathway, where such data may be used to depict a flight plan in the form of a HITS pathway that has been subjected to flight director data to determine its location on a tactical display unit. As embodied herein, the receiving of any data by a processor 140 or the providing of data to a processor 140 may include a step in which the processor performs a retrieval operation of such data.

The flowchart continues with module 304 with the receiving of flight director data by a processor 140. Flight director data represents lateral and/or vertical guidance. The determination of guidance data may be computed by an FD system 130 through the use of guidance algorithm(s) by applying the data received from one or more aircraft systems to the guidance algorithm(s) including, but not limited to, data received from an FMS 110 and FCP 122. The knowledge and use of guidance algorithm(s)—and the application of the received data to the guidance algorithm(s)—are known to those skilled in the art.

The positioning of the flight director depicted on a tactical display unit may depend on a flight mode selected or chosen by a pilot. In one embodiment, a pilot may choose to follow a vertical and horizontal flight plan defined by an FMS 110 by engaging corresponding vertical and horizontal modes through the selection of applicable switches on an FCP 122. In another embodiment, a pilot may choose to follow a vertical flight plan defined by the pilot and horizontal flight plan defined by an FMS 110 by engaging corresponding vertical and horizontal modes through the selection of applicable switches on an FCP 122. In another embodiment, a pilot may choose to follow a vertical flight plan of an FMS 110 and horizontal flight plan defined by the pilot by engaging corresponding vertical and horizontal modes through the selection of applicable switches on an FCP 122. In each of these embodiments, data representative of these flight modes and flight plans may be provided to an FD system 130 by an FCP 122 and FMS 110, respectively, and applied to guidance algorithms, where vertical and lateral guidance data may be computed and provided to a processor 140.

The flowchart continues to module 306 with the generation of a HITS data set by a processor 140, where such HITS data set is representative of a HITS pathway that could be derived using flight director data and flight plan data; that is, such HITS data is representative of a flight director-dependent HITS pathway. In one embodiment, a processor 140 could be programmed to receive flight plan data used for the generation of a HITS pathway and flight director data used for the positioning of the proximal end of the pathway to align with the flight director. In another embodiment, a processor 140 could be programmed to receive flight plan data representative of HITS pathway and flight director data used for the positioning of the proximal end of the pathway to align with the flight director. In another embodiment, a processor 140 could be programmed to include data representative of flight director symbology in the HITS data set.

The flowchart continues to module 308 with the providing of the HITS data set to a display system 150, wherein a flight director-dependent HITS pathway may be displayed on a tactical display unit. In one embodiment, a tactical display unit includes an HDD unit 152 and/or a HUD unit 154. In another embodiment, if a HITS data set includes data representative of flight director symbology, a tactical display unit could present a flight director on a tactical display unit along with the flight director-dependent HITS pathway, where the proximal end of such HITS pathway aligns with the flight director. Then, the flowchart proceeds to the end.

It should be noted that the method steps described above may be embodied in computer-readable media as computer instruction code. It shall be appreciated to those skilled in the art that not all method steps described must be performed, nor must they be performed in the order stated.

As used herein, the term "embodiment" means an embodiment that serves to illustrate by way of example but not limitation.

It will be appreciated to those skilled in the art that the preceding examples and embodiments are exemplary and not limiting to the scope of the present invention. It is intended that all permutations, enhancements, equivalents, and improvements thereto that are apparent to those skilled in the art upon a reading of the specification and a study of the drawings are included within the true spirit and scope of the present invention. It is therefore intended that the following appended claims include all such modifications, permutations and equivalents as fall within the true spirit and scope of the present invention.

What is claimed is:

1. A system for presenting a flight director-dependent highway-in-the-sky pathway on a tactical display unit, such system comprising:
a source of flight mode data;
a source of flight plan data;
a source of flight director data;
a processor configured to
  receive flight plan data,
  receive flight director data representative of a change of at least vertical guidance, where
    the change of vertical guidance is made in response to a manual change of a vertical mode parameter,
  generate an image data set representative of
    a first image of a flight director symbology, and
    a second image of a highway-in-the-sky pathway, wherein
      the second image is comprised of a proximal end and a distal end,
      the location of the proximal end of the second image is
        dependent upon the location of the first image, and
        aligned vertically with the first image, and the location of the distal end of the second image is
  based upon the flight plan data, and
  dependent upon the path of the flight plan, and
provide the image data set to an aircraft display system; and
the aircraft display system configured to
  receive the image data set, and
  display the first image and the second image, whereby
    the first image moves vertically in response to the manual change of a vertical mode parameter,
    the proximal end of the second image moves vertically in response to vertical movement of the first image, and
    the vertical alignment of the second image is maintained with the first image during the vertical movements of the first image and the second image.

2. The system of claim 1, where the source of flight mode data is a pilot interface system.

3. The system of claim 2, where the pilot interface system is comprised of a flight control panel.

4. The system of claim 1, where the flight mode data is comprised of data representative of a vertical flight mode, lateral flight mode, or both.

5. The system of claim 1, where the source of flight plan data is a flight management system.

6. The system of claim 1, where the flight plan data is comprised of data representative of a vertical flight plan, lateral flight plan, or both.

7. The system of claim 1, where the source of flight director data is a flight director system.

8. The system of claim 1, where the flight director data is further representative of a change of lateral guidance.

9. The system of claim 1, wherein the processor is incorporated into an existing avionics system.

10. The system of claim 9, wherein the existing avionics system includes a flight management system, a flight director system, or the aircraft display system.

11. The system of claim 1, where the flight plan data received by the processor is comprised of data representative of a highway-in-the-sky pathway generated independently of the flight director data.

12. A module for presenting a flight director-dependent highway-in-the-sky pathway, such module comprising:
an input communications interface to facilitate the receiving of data from at least one data source by a processor;
the processor configured to
  receive flight plan data,
  receive flight director data representative of a change of at least vertical guidance, where
    the change of vertical guidance is made in response to a manual change of a vertical mode parameter,
  generate an image data set representative of
    a first image of a flight director symbology, and
    a second image of a highway-in-the-sky pathway, wherein
      the second image is comprised of a proximal end and a distal end,
      the location of the proximal end of the second image is
        dependent upon the location of the first image, and
        aligned vertically with the first image, and
      the location of the distal end of the second image is
        based upon the flight plan data, and
        dependent upon the path of the flight plan, and
  provide the image data set to an aircraft display system, such that
    the first image and the second image are displayed, whereby
      the first image moves vertically in response to the manual change of a vertical mode parameter,
      the proximal end of the second image moves vertically in response to vertical movement of the first image, and
      the vertical alignment of the second image is maintained with the first image during the vertical movements of the first image and the second image; and
an output communications interface to facilitate the providing of the image data set to the aircraft display system.

13. The module of claim 12, wherein the module is incorporated into an existing avionics system.

14. The module of claim 13, wherein the existing avionics system includes a flight management system, a flight director system, or the aircraft display system.

15. The module of claim 12, where the flight plan data received by the processor is comprised of data representative of a highway-in-the-sky pathway generated independently of flight director data.

16. A method for presenting a flight director-dependent highway-in-the-sky pathway, such method comprising:
performing the following elements, where such elements are performed by an aircraft avionics system processor:
  receiving flight plan data;
  receiving flight director data representative of a change of at least vertical guidance, where
    the change of vertical guidance is made in response to a manual change of a vertical mode parameter;
  generating an image data set representative of
    a first image of a flight director symbology, and
    a second image of a highway-in-the-sky pathway, wherein
      the second image is comprised of a proximal end and a distal end,
      the location of the proximal end of the second image is
        dependent upon the location of the first image, and
        aligned vertically with the first image, and
      the location of the distal end of the second image is
        based upon the flight plan data, and
        dependent upon the path of the flight plan; and
  providing the image data set to an aircraft display system, such that
    the first image and the second image are displayed, whereby
      the first image moves vertically in response to the manual change of a vertical mode parameter,
      the proximal end of the second image moves vertically in response to vertical movement of the first image, and
      the vertical alignment of the second image is maintained with the first image during the vertical movements of the first image and the second image.

17. The method of claim 16, where the flight plan data received is comprised of data representative of a highway-in-the-sky pathway generated independently of flight director data.

* * * * *